US008075804B2

(12) United States Patent
Carter et al.

(10) Patent No.: US 8,075,804 B2
(45) Date of Patent: Dec. 13, 2011

(54) ANTIOXIDANT COMPOSITIONS USEFUL IN BIODIESEL AND OTHER FATTY ACID AND ACID ESTER COMPOSITIONS

(75) Inventors: Thomas Edward Carter, Kingsport, TN (US); Joy Lynn Laningham, Erwin, TN (US); Phillip Montgomery Hudnall, Kingsport, TN (US); Sharon Metcalf Cline, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 386 days.

(21) Appl. No.: 11/657,961

(22) Filed: Jan. 25, 2007

(65) Prior Publication Data

US 2007/0197412 A1    Aug. 23, 2007

Related U.S. Application Data

(60) Provisional application No. 60/764,997, filed on Feb. 3, 2006, provisional application No. 60/857,272, filed on Nov. 7, 2006.

(51) Int. Cl.
*C09K 15/00* (2006.01)
*C09K 15/04* (2006.01)
*C09K 3/00* (2006.01)
*C23F 11/00* (2006.01)
*C10L 1/22* (2006.01)
*C10L 1/18* (2006.01)

(52) U.S. Cl. .............. 252/404; 252/182.11; 252/182.29; 252/393; 252/399; 252/397; 44/450; 44/399; 44/421; 44/446; 44/445; 44/385; 44/321; 44/308; 44/601; 44/605; 44/306; 508/584

(58) Field of Classification Search ............. 252/182.11, 252/182.29, 393, 399, 397, 404; 44/450, 44/399, 391, 421, 446, 445, 385, 321, 207, 44/308, 605, 306, 601; 508/584
See application file for complete search history.

(56) References Cited

U.S. PATENT DOCUMENTS

| | | | | |
|---|---|---|---|---|
| 2,181,121 A * | 11/1939 | Downing et al. | ............. | 252/403 |
| 2,345,097 A * | 3/1944 | Buxton | ......................... | 514/168 |
| 2,383,580 A * | 8/1945 | Arrowsmith et al. | ......... | 554/167 |
| 2,383,601 A * | 8/1945 | Keim | ........................... | 554/167 |
| 4,565,547 A | 1/1986 | Takada | | |
| 4,769,178 A | 9/1988 | Kenmochi et al. | | |
| 5,087,268 A | 2/1992 | Parish | | |
| 5,520,708 A * | 5/1996 | Johnson et al. | ................ | 44/388 |
| 5,578,090 A * | 11/1996 | Bradin | ........................... | 44/308 |
| 5,713,965 A * | 2/1998 | Foglia et al. | .................... | 44/388 |
| 6,015,440 A * | 1/2000 | Noureddini | .................... | 44/388 |
| 6,174,501 B1 * | 1/2001 | Noureddini | ................... | 422/618 |
| 6,447,557 B1 * | 9/2002 | Yeh et al. | ........................ | 44/437 |
| 6,447,558 B1 * | 9/2002 | Yeh et al. | ........................ | 44/437 |
| 6,458,176 B2 * | 10/2002 | Yeh et al. | ........................ | 44/437 |
| 7,722,688 B2 * | 5/2010 | Filippini et al. | ................ | 44/301 |
| 2003/0126790 A1 | 7/2003 | McCoy | | |
| 2003/0181532 A1 * | 9/2003 | Parris et al. | ...................... | 516/20 |
| 2004/0111957 A1 * | 6/2004 | Filippini et al. | ................ | 44/351 |
| 2004/0139649 A1 | 7/2004 | Ingendoh et al. | | |
| 2004/0195549 A1 * | 10/2004 | Adams et al. | ................. | 252/399 |
| 2004/0200137 A1 * | 10/2004 | Bongardt et al. | ............... | 44/417 |
| 2006/0162240 A1 * | 7/2006 | Filippini et al. | ................ | 44/385 |
| 2007/0113467 A1 * | 5/2007 | Abou-Nemeh | ................ | 44/388 |
| 2008/0019860 A1 * | 1/2008 | Abou-Nemeh et al. | .......... | 422/1 |

FOREIGN PATENT DOCUMENTS

| | | | |
|---|---|---|---|
| CN | 1 197 111 | | 10/1998 |
| DE | 102 52 714 | | 5/2004 |
| EP | 0482253 A1 | * | 10/1990 |
| EP | 0626442 A1 | * | 5/1994 |
| EP | 0 626 442 B1 | | 11/1994 |
| GB | 312 774 | | 6/1929 |
| GB | 318 521 | | 12/1930 |
| GB | 682 205 | | 11/1952 |
| GB | 777 811 | | 6/1957 |
| GB | 1 100 993 | | 1/1968 |
| WO | WO 96/40844 | * | 12/1996 |
| WO | WO 03/016441 | | 2/2003 |
| WO | WO 2004/090062 | | 10/2004 |

OTHER PUBLICATIONS

GB 679,192 patent document (pdf).*
GB 682,205 patent document (pdf).*
Mittelbach et al. "The Influence of Antioxidants on the Oxidation Stability of Biodiesel", JAOCS, vol. 80, No. 8, 2003, p. 817-823.*
National Biodiesel Board, Determination of Biodiesel Oxidation and Thermal Stability, Final Report, prepared by System Lab Services. Feb. 12, 1997.*
Technical Abstract, Robert Dunn "Effect of Mixed Antioxidants on Oxidative Stability of Biodiesel", Annualy Meeting and Expo of the American Oil Chemists' Society. May 15, 2004. ("ARS-_RobertDunn_2004.pdf").*
Bondioli, Paolo; Gasparoli, Ada; Della Bella, Laura; Tagliabue, Silvia; Toso, Guido, "Biodiesel stability under commercial storage conditions over one year", European Journal of Lipid Science and Technology (2003), 105(12), 735-741.
Dittmar, Thomas; Ondruschka, Bernd; Haupt, Jens; Lauterbach, Manfred, "Ermittlung des Einflusses von Fettrohstoff und Prozesstechnologie auf die Oxidationsstabilitat von Fettsauremethylester", Chemie Ingenieur Technik (2004), 76(8), 1170-1179.
Dunn, Robert O, "Effect of antioxidants on the oxidative stability of methyl soyate (biodiesel)", Fuel Processing Technology (2005), 86(10), 1071-1085.

(Continued)

Primary Examiner — Mark Eashoo
Assistant Examiner — Jane L Stanley
(74) Attorney, Agent, or Firm — William K. McGreevey; Bernard Graves, Jr.

(57) ABSTRACT

Compositions containing phenolic antioxidant solutions are provided. The invention further provides methods of making and using such compositions as well as compositions that contain both biodiesel and at least one antioxidant concentrate solutions and blended fuel compositions containing biodiesel blended with other fuels.

22 Claims, No Drawings

OTHER PUBLICATIONS

Dunn, Robert O., "Oxidative Stability of Soybean Oil Fatty Acid Methyl Esters by Oil Stability Index (OSI)", Journal of the American Oil Chemists' Society (2005), 82(5), 381-387.

Du Plessis, L.M.; and De Villiers, J.B.M.; "Stability Studies on Methyl and Ethyl Fatty Esters of Sunflower Seed Oil"; In *Vegetable Oil as Diesel Fuel*, Seminar III; Oct. 19-20, 1983; eds. M.O. Bagby, and E.H. Pryde; 57-62; Peoria, Ill.; USDA Northern Regional Research Center.

Eastman Chemical Company Brochure entitled "Tenox, Food-Grade Antioxidants for Refined Vegetable Oils" dated 1992.

Hess, Melissa A.; Haas, Michael J.; Foglia, Thomas A.; Marmer, William N.; "Effect of Antioxidant Addition on $NO_x$ Emissions from Biodiesel", Energy & Fuels (2005), 19(4), 1749-1754.

McCormick, Bob; National Renewable Energy Laboratory; "Biodiesel and Renewable Fuels"; Presented in Denver, Colorado; Jun. 11, 2003.

McCormick, Bob; National Renewable Energy Laboratory; "Biodiesel Research Update"; Presented at US DOE 10th Annual Diesel Engine Emissions Reduction Conference; Coronado, California; Aug. 30, 2004.

Miyata, Itsuki; Takei, Yasunori; Tsurutani, Kazushi; Okada, Masanori, "Effects of Bio-Fuels on Vehicle Performance: Degradation Mechanism Analysis of Bio-Fuels", Society of Automotive Engineers, [Special Publication] SP (2004), SP-1897(Alternative and Oxygenated Fuels), 107-115.

Prankl, Heinrich (Project Coordinator); "Stability of Biodiesel—Used as a Fuel for Diesel Engines and Heating Systems"; Presentation of the BIOSTAB Project Results; Graz; Published by BLT Wieselburg, Austria (2003).

Schober, Sigurd; Mittelbach, Martin, "Influence of diesel particulate filter additives on biodiesel quality", European Journal of Lipid Science and Technology (2005), 107(4), 268-271.

Schober, Sigurd; Mittelbach, Martin, "The impact of antioxidants on biodiesel oxidation stability", European Journal of Lipid Science and Technology (2004), 106(6), 382-389.

Sendzikiene, E.; Makareviciene, V.; Janulis, P., "Oxidation Stability of Biodiesel Fuel Produced from Fatty Wastes", Polish Journal of Environmental Studies (2005), 14(3), 335-339.

Tyson, K. Shaine; "Biodiesel Handling and Use Guidelines"; Technical Report; National Renewable Energy Laboratory; Sep. 2001.

Westbrook, S.R.; "An Evaluation and Comparison of Test Methods to Measure the Oxidation Stability of Neat Biodiesel"; Subcontract Report for National Renewable Energy Laboratory; 2005.

Notification Concerning Transmittal of International Preliminary Report on Patentability received in corresponding International Application No. PCT/US2007/001863 date of mailing Aug. 14, 2008.

Notification of Transmittal of the International Search Report and the Written Opinion of the International Searching Authority, or the Declaration received in corresponding International Application No. PCT/US2007/001863 date of mailing Jan. 25, 2007.

Eastman Material Safety Data Sheet dated Apr. 22, 2003 for TENOX 21 Food-Grade Antioxidant, Kosher.

* cited by examiner

US 8,075,804 B2

ANTIOXIDANT COMPOSITIONS USEFUL IN BIODIESEL AND OTHER FATTY ACID AND ACID ESTER COMPOSITIONS

CROSS REFERENCE TO RELATED APPLICATIONS

Priority is claimed to U.S. Provisional Application No. 60/764,997, filed Feb. 3, 2006 and to U.S. Provisional Application No. 60/857,272, filed Nov. 7, 2006.

FIELD OF THE INVENTION

The present invention relates to compositions and methods involving antioxidant formulations that are suitable for use in fatty acid and fatty acid ester compositions such as those used in the food and/or fuel industries.

DESCRIPTION OF RELATED ART

Animal fats, such as edible-grade lard and tallow, and vegetable oils, such as sunflower, rapeseed, soybean, corn, palm and coconut oils, have found widespread use in the food industry. Recently, the use of virgin and reclaimed animal fats and vegetable oils as an alternative energy source, such as use of esterified fatty acids in biodiesel, has been investigated. One problem associated with the use of these materials is their susceptibility to oxidation. Such oxidation can result in decomposition of unsaturated fatty acid esters into undesirable compounds. The decomposition can lead to precipitation and formation of materials that can cause problems with engine parts such as injection systems, pumps and nozzles of the diesel engines as well as incomplete combustion and increased soot formation. Protecting the fuel quality of biodiesel and its blends with petroleum diesel during long term storage is desirable for manufacturers, blenders, suppliers, and users.

The use of antioxidants in biodiesel has therefore been considered. Various formulations containing phenolic antioxidant compounds such as butylated hydroxyanisole (BHA), as 2,6-di-tert-butylphenol, 2,6-di-tert-butyl-4-methylphenol (BHT) and tert-butylhydroquinone (TBHQ) have been examined for their ability to reduce or slow oxidation. A common method for incorporating antioxidants into biodiesel is in a solution form. However, finding solvents that will carry higher concentrations of phenolic antioxidants along with other additives, while being miscible with biodiesel, is a challenge. There is a continued need for new concentrated formulated antioxidants in solution form for biodiesel stabilization.

SUMMARY OF THE INVENTION

The present invention provides compositions useful as antioxidant concentrate solutions. The compositions contain at least one phenolic antioxidant, at least one metal chelating compound and at least one solvent. It has been found that selection of the proper components or methods of preparation allows preparation of solutions that contain high concentrations of phenolic antioxidants while also dissolving a metal chelating agent and being miscible with biodiesel. In some embodiments, it has been found that selecting the proper order in which to combine the components can improve the ability to achieve higher concentrations of phenolic antioxidants when used in connection with metal chelating compounds. Thus, the invention further includes methods of making the concentrate solutions. The invention further includes biodiesel fuel compositions that contain the concentrate solutions of the present invention as well as fuel compositions comprising biodiesel as well as other burnable sources such as petroleum diesel. The invention further includes methods of using the antioxidant concentrate solutions of the present invention.

DETAILED DESCRIPTION OF THE INVENTION

Compositions containing phenolic antioxidant solutions are provided. The invention further provides methods of making and using such compositions as well as compositions that contain both biodiesel and at least one antioxidant concentrate solution and blended fuel compositions containing biodiesel blended with other fuels. In some cases, for example, difficulties arise in dissolving citric acid in solvents that can dissolve high concentrations of antioxidant to form a solution that is readily miscible in biodiesel. The invention overcomes this problem in many ways. For example, in some embodiments, the invention provides a proper solvent or combination of solvents that will allow achieving higher concentrations than previously achieved. In some embodiments, the invention provides alternate metal chelating compounds having more compatible solubility than citric acid. In some embodiments, the invention provides single solvent or solvent matrices that allow higher concentrations to be achieved. In some embodiments, the components are combined in a specific order that has been found to allow higher concentrations to be achieved.

Biodiesel

As used throughout this application, "biodiesel" shall mean compositions that contain at least about 50% by weight of esters of saturated and unsaturated fatty acids that can be used as biodiesel fuel for diesel engines. In some embodiments, the biodiesel contains higher concentrations by weight of the esters, with examples being at least about 60%, at least about 70%, at least about 80% at least about 90%, at least about 95%, or at least about 99%, in each case the percentages being by weight. In some embodiments the esters are methyl esters, ethyl esters, or propyl esters of fatty acids, or combinations of two or more thereof. In some embodiments the esters are methyl esters of fatty acids. In some embodiments, the fatty acid esters in biodiesel are one or more $C_{14}$ to $C_{24}$ fatty acid methyl esters, where $C_{14}$ to $C_{24}$ refers to the number of carbons bonded to the methyl group by the ester linkage.

Antioxidant Concentrate Solutions

The invention provides antioxidant concentrate solutions, which are compositions containing concentrated phenolic antioxidants for delivery into biodiesel. The compositions include at least one phenolic antioxidant and at least one solvent or combination of solvents and optionally other components. Metal chelating compounds are examples of additional components. Thus, in some embodiments the composition comprises at least one phenolic antioxidant compound, at least one metal chelating compound, and at least one solvent. Other components may also be present.

Phenolic Antioxidant

As used throughout this application, "phenolic antioxidants" or "antioxidants" shall mean compounds that slow oxidation of fatty acid esters selected from: phenol compounds, bisphenol compounds, diphenol compounds, diphenol monoether compounds and triphenol compounds. Some examples of phenol compounds having antioxidant activity include mono, di, and trialkylated phenols such as 2,6-di-tert-butylphenol, 2,4-di-tert-butylphenol, and 2,6-di-tert-butyl-4-methylphenol (BHT). Some examples of bisphenol compounds having antioxidant activity include 2,2'-methylenebis-(4-methyl-6-tert-butylphenol) (BKF) and 2,2'-methylene-bis-(4-methyl-6-cyclohexylphenol). Some examples of diphenol compounds having antioxidant activity include hydroquinone (HQ), mono and dialkylated hydroquinones having one or two $C_1$-$C_8$ alkyl groups (e.g. tert-butylhydroquinone (TBHQ), 2,5-di-tert-butylhydroquinone (DTBHQ), methylhydroquinone (also known as. 2-methylhydroquinone, toluhydroquinone or THQ), 2,5-di-tert.-octyl-hydroquinone (DOH)), catechol (also known as pyrocatechol) and mono and dialkylated catechols having one or two $C_1$-$C_8$ alkyl groups (e.g. tert-butylcatechol). As used throughout this application, references to "$C_1$-C8 alkyl groups" refers to alkyl groups that possess one to eight carbon atoms. In some embodiments, the diphenol compound selected is TBHQ. Some examples of diphenol monoether compounds having antioxidant activity include 4-methoxyphenol (hydroquinone monomethyl ether, or HQMME)) and 2-methoxyphenol (guaiacol, or catechol monomethyl ether), butylated hydroxyanisole (BHA). Some examples of triphenol compounds having antioxidant activity include pyrogallol (1,2,3-trihydroxybenzene) and $C_1$-$C_{18}$ esters of gallic acid such as n-propyl gallate. In some embodiments, at least one triphenol compound is a $C_1$-$C_8$ ester of gallic acid. In some embodiments, at least one triphenol compounds is pyrogallol.

As used throughout this application, references to carbon numbers in connection with alkyl groups (e.g. "$C_1$-$C_8$ alkyl groups") refers to alkyl groups that possess the number of carbon atoms referred to (one to eight carbon atoms in the example given). As used throughout this application, "alkyl groups" shall refer to saturated, unsubstituted groups containing one or more carbon atoms along with hydrogen atoms. Alkyl groups may be branched or unbranched.

In some embodiments, the phenolic antioxidant is selected from diphenols, triphenols and bisphenols. In some embodiments, the phenolic antioxidant is selected from the diphenols described above, or a combination thereof. In some embodiments, at least one of the diphenols is TBHQ. In some embodiments, at least one of the diphenols is catechol or a mono and dialkylated catechol having one or two $C_1$-$C_{16}$ alkyl groups. In some embodiments, at least one of the diphenols is t-butyl catechol. In some embodiments, at least one phenolic antioxidant is selected from the triphenols described above. In some embodiments, at least one phenolic antioxidant is pyrogallol. In some embodiments, at least one phenolic antioxidant is selected from TBHQ, t-butyl catechol and pyrogallol. In some embodiments, at least one phenolic antioxidant is selected from the bisphenols described above, or a combination thereof. In some embodiments, at least one phenolic antioxidant is BKF. Embodiments exist that include a single phenolic antioxidant, while others contain a combination of two or more phenolic antioxidants.

Metal Chelating Compound

As used throughout this application, the terms "metal chelating compound," "metal chelator" and "chelator" shall all mean any compounds that will chelate metal cations present in biodiesel. The addition of metal chelating compounds to phenolic antioxidants further increases the oxidative stability of biodiesel. Any suitable metal chelator may be used and many chelators are known in the art. Some examples include: hydroxycarboxylic acid chelators, such as citric acid; hydroxycarboxylic acid ester chelators such as triethyl citrate and monostearyl citrate; Schiff Bases such as N,N-disalicylidene-1,2-propanediamine, (DMD); aminoalcohols such as triethanolamine and N-hydroxyethylethylenediamine; polyamines such as ethylenediamine and diethylenetriamine; and aminocarboxylic acid chelators such as ethylenediaminetetraacetic acid (EDTA). Mixtures of metal chelating compounds can also be used. In some embodiments, at least one metal chelator is selected from hydroxycarboxylic acid ester chelators, hydroxycarboxylic acid ester chelators, Schiff Bases, aminoalcohols, polyamines and aminocarboxylic acid chelators. In some embodiments, at least one metal chelator is selected from one or more of the preceding examples or groups of examples. In some embodiments, at least one metal chelating compound is a hydroxycarboxylic acid ester chelator. In some embodiments, at least one metal chelating compound is a hydroxycarboxylic acid chelator. In some embodiments, at least one metal chelating compound is an aminoalcohol. In some embodiments, the metal chelating compound is a polyamine. In some embodiments, at least one metal chelating compound is citric acid. In some embodiments, at least one metal chelating compound is triethyl citrate. Embodiments exist that include a single metal chelating compounds, while others contain a combination of two or more metal chelating compounds.

Solvents

The solvents of the present invention may be a single compound or a combination of solvent compounds, such as in a solvent matrix. In some embodiments, the solvents are selected from monofunctional alcohols, glycols, polyols, esters, ethers, glycol ether acetates, ketones, glycol ethers, amides, nitro compounds and combinations of two or more of the foregoing. In some embodiments, the solvent is liquid at standard temperature and pressure.

In some embodiments, at least one of the solvent compounds is a monofunctional alcohol. Some examples of monofunctional alcohols include $C_1$-$C_{25}$ monofunctional alcohols, but also include monofunctional alcohols selected from smaller ranges such as $C_2$-$C_{25}$ alcohols, $C_2$-$C_{10}$ alcohols, $C_3$-$C_{10}$ alcohols, $C_3$-$C_{18}$ alcohols, $C_8$-$C_{18}$ alcohols, and so forth. Some examples of $C_3$-$C_{18}$ monofunctional alcohols include n-propyl alcohol, isopropyl alcohol, n-butyl alcohol, amyl alcohol, 2-ethyl hexanol, decyl alcohol, and 1-octadecanol. As used throughout this application, references to compounds as having a specific number of carbon atoms (e.g. "$C_2$-$C_{10}$") refers to compounds for which the total number of carbon atoms in the molecule is in the range specified (e.g. 2-10 total carbons).

In some embodiments, at least one of the solvent compounds is a polyol. Some examples of polyol solvents include glycols such as ethylene glycol, polyethylene glycol, propylene glycol, diethylene glycol, dipropylene glycol, triethylene glycol, tripropylene glycol. In some embodiments, the polyol used is propylene glycol.

In some embodiments, at least one of the solvent compounds is a glycol ether. As used throughout this application, a "glycol ether" shall mean to a molecule having the structure of a glycol except that the molecule possesses an ether linkage to an alkyl group instead of one of the hydroxyl groups. Thus a monoalkyl ether of ethylene glycol, for example, has the structure of ethylene glycol with an ether linkage connected to an alkyl group instead of one of the two hydroxyl groups normally found on ethylene glycol. By way of further example, "ethylene glycol mono butyl ether" refers to a molecule having the structure of ethylene glycol with an ether linkage connected to a butyl group. Further, a reference to a number of carbons on the ether refers to the number of carbons in an alkyl group attached to the ether linkage. Thus, a "$C_3$-$C_{10}$ glycol ether" refers to a glycol ether in which alkyl group attached to the ether has three to ten carbons.

In some embodiments, the glycol ether solvent includes 1-3 ether linkages and exactly one hydroxy (—OH) group. Some examples include $C_1$-$C_{12}$ monoalkyl ethers of ethylene glycol, $C_1$-$C_{12}$ monoalkyl ethers of diethylene glycol, $C_1$-$C_{12}$ monoalkyl ethers of triethylene glycol, $C_1$-$C_{12}$ monoalkyl ethers of propylene glycol, $C_1$-$C_{12}$ monoalkyl ethers of dipropylene glycol, and $C_1$-$C_{12}$ monoalkyl ethers of tripropylene glycol. Examples include ethylene glycol monopropyl ether (available as Eastman EP Solvent from Eastman Chemical Company, Kingsport Tenn., USA), ethylene glycol monobutyl ether, ethylene glycol monohexyl ether, ethylene glycol mono-2-ethylhexyl ether, diethylene glycol monomethyl ether, diethylene glycol monoethyl ether, diethylene glycol monopropyl ether, diethylene glycol monobutyl ether (available as Eastman DB Solvent from Eastman Chemical Company, Kingsport Tenn., USA), propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol mono-n-propyl ether, dipropylene glycol mono-n-butyl ether, and combinations of two or more thereof. In some embodiments, the glycol ether is selected from diethylene glycol monobutyl ether and ethylene glycol monopropyl ether.

In some embodiments, at least one of the solvent compounds is an ester. Examples of ester solvents include $C_3$-$C_{24}$ esters (wherein $C_3$-$C_{24}$ refers to the number of carbon atoms on the larger of the two groups of carbon atoms on either side of the ester linkage; the groups may be branched, unbranched, saturated or unsaturated). Some examples of ester solvents include methyl acetate, ethyl acetate, n-propyl acetate, isopropyl acetate, n-butyl acetate, isobutyl acetate, tert-butyl acetate, amyl acetate, methyl amyl acetate, n-propyl propionate, n-butyl propionate, isobutyl isobutyrate, 2-ethylhexyl acetate, ethylene glycol diacetate, dimethyl adipate, dimethyl succinate, dimethyl glutarate, $C_{12}$-$C_{24}$ fatty acid methyl esters, propylene glycol diacetate (diacetoxypropane), and combinations of two or more thereof. In some embodiments, the ester solvent is a $C_3$-$C_{15}$ compound.

In some embodiments, at least one of the solvent compounds is a glycol ether ester compound. In some embodiments, the glycol ether ester compound is a $C_1$-$C_{12}$ glycol ether ester compound, in which $C_1$-$C_{12}$ refers to the number of carbons in the alkyl group attached to the ether linkage. Glycol ether esters have structures similar to glycol ethers except that they possess an ester linkage in the place of the hydroxy group on the corresponding glycol ether. Thus, for example, ethylene glycol monobutyl ether acetate, has the structure of ethylene glycol monobutyl ether with an acetate group substituted for the hydroxy group. Some examples include acetate esters of $C_1$-$C_{12}$ monoalkyl ethers of ethylene glycol, the acetate esters of $C_1$-$C_{12}$ monoalkyl ethers of diethylene glycol, the acetate esters of $C_1$-$C_{12}$ monoalkyl ethers of triethylene glycol, the acetate esters of $C_1$-$C_{12}$ monoalkyl ethers of propylene glycol, the acetate esters of $C_1$-$C_{12}$ monoalkyl ethers of dipropylene glycol, and the acetate esters of $C_1$-$C_{12}$ monoalkyl ethers of tripropylene glycol. More specific examples include ethyl-3-ethoxypropionate, ethylene glycol monobutyl ether acetate, ethylene glycol monoethyl ether acetate, propylene glycol monoethyl ether acetate, propylene glycol monomethyl ether acetate, diethylene glycol monoethyl ether acetate, diethylene glycol monobutyl ether acetate, dipropylene glycol monomethyl ether acetate, and combinations of two or more thereof.

In some embodiments, at least one of the solvent compounds is an ether compound. Some examples of solvents selected from the class of ethers include diisopropyl ether, tetrahydofuran (THF), dipropylene glycol dimethyl ether, and combinations of two or more thereof. In some embodiments, the ether is THF.

In some embodiments, at least one of the solvent compounds is a ketone. Some examples of solvents selected from the class of ketones include straight or branched $C_3$-$C_{14}$ ketones (wherein $C_3$-$C_{14}$ refers to the number of carbon atoms in the ketone molecule). In some embodiments, ketones are selected from acetone, methyl ethyl ketone, methyl propyl ketone, methyl isobutyl ketone, methyl isoamyl ketone, cyclohexanone, methyl amyl ketone, and combinations of two or more thereof.

In some embodiments, at least one of the solvent compounds is an amide compound. In some embodiments, the amide is a $C_2$-$C_{10}$ amide (wherein $C_2$-$C_{10}$ refers to the number of carbon atoms in the ketone molecule). Some examples of solvents selected from the class of amides include N,N-dimethylformamide (DMF), N-methylpyrrolidone and dimethylacetamide and combinations of two or more thereof. In some embodiments, the amide is DMF.

In some embodiments, at least one of the solvent compounds is a nitro compound. Some examples of solvents selected from the class of nitro compounds include nitropropane isomers, nitrobenzene and combinations of two or more thereof.

In some embodiments, the solvent is a single solvent compound selected from one of the $C_1$-$C_{12}$ glycol ethers, $C_2$-$C_{10}$ amides, $C_3$-$C_{14}$ ketones, $C_2$-$C_{10}$ ethers, $C_3$-$C_{25}$ esters, polyols, and one of the above groups of alcohols (e.g. $C_2$-$C_{24}$ alcohols or $C_3$-$C_{18}$ alcohols). In some embodiments, the solvent is a single solvent selected from one of the $C_2$-$C_{15}$ glycol ethers, $C_2$-$C_{10}$ amides, $C_3$-$C_{14}$ ketones, $C_2$-$C_{10}$ ethers, $C_3$-$C_{15}$ esters, polyols, and one of the above groups of alcohols (e.g. $C_2$-$C_{24}$ alcohols or $C_3$-$C_{18}$ alcohols). In some embodiments, the single solvent compound is selected from glycol ethers, alcohols, and amides. In some embodiments, the single solvent compound is selected from glycol ethers and alcohols. In some embodiments, the single solvent compound is selected from ethylene glycol monopropyl ether, diethylene glycol monobutyl ether, ethanol, isopropanol, and DMF. In some embodiments, the single solvent compound is selected from ethylene glycol monopropyl ether and diethylene glycol monobutyl ether. In some embodiments the single solvent compound is selected from glycol ethers, alcohols, ethers, ketones, amides and esters. In some embodiments the single solvent compound is selected from amides, ketones, esters.

In some embodiments, the solvent includes a combination of two or more compounds. In some embodiments, the solvent compounds include at least one glycol ether and at least one glycol, wherein the glycol is present at a concentration of at least about 7% weight percent based on the total weight of the total antioxidant concentrate composition. In some embodiments, the compounds include at least one ester compound and at least one glycol, wherein the glycol is present at a concentration of at least about 7% weight percent based on the total weight of the total antioxidant concentrate composition. In some embodiments, the compounds include at least one ester compound and at least one alcohol, wherein the alcohol is present at a concentration of at least about 7% weight percent based on the total weight of the total antioxidant concentrate composition. In some embodiments, the compounds include at least one ketone and at least one glycol, wherein the glycol is present at a concentration of at least about 7% weight percent based on the total weight of the total antioxidant concentrate composition.

Any useful combination can be selected. In some embodiments of the present invention the solvent mixture contains from about 25 to about 45 weight % of an ester, from about 45 to about 65 weight % of a glycol ether, and from about 1 to about 20 weight % of a polyol, wherein the solvent weight percentages are based on the total weight of all solvents. In some embodiments of the present invention the solvent mixture contains from about 30 to about 40 weight % of an ester, from about 50 to about 60 weight % of a glycol ether, and from about 5 to about 15 weight % of a glycol, wherein the solvent weight percentages are based on the total weight of all solvents. In some such embodiments, the ester is selected from methyl acetate, ethyl acetate, n-propyl acetate, isopropyl acetate, n-butyl acetate, isobutyl acetate, tert-butyl acetate, propylene glycol diacetate and combinations of two or more thereof; the glycol ether solvent is selected from ethylene glycol monopropyl ether, ethylene glycol monobutyl ether, ethylene glycol mono-2-ethylhexyl ether, diethylene glycol monomethyl ether, diethylene glycol monoethyl ether, diethylene glycol monopropyl ether, diethylene glycol monobutyl ether, propylene glycol monomethyl ether, dipropylene glycol monomethyl ether, dipropylene glycol monoethyl ether, and combinations of two or more thereof; and from the polyol solvent selected from ethylene glycol, polyethylene glycol, propylene glycol, diethylene glycol, dipropylene glycol and combinations of two or more thereof. In some of the foregoing embodiments, the ester is n-butyl acetate, the glycol ether is diethylene glycol monobutyl ether and the polyol is propylene glycol.

In some embodiments, the solvent includes a single solvent compound selected from ethers, amides, alcohols and glycol ethers. In some embodiments, the solvent compound is selected from ethylene glycol monopropyl ether, diethylene glycol mono butyl ether, ethylene glycol mono 2-ethylhexyl ether, DMF, THF, propanol, and ethanol. In some embodiments, the solvent compound is selected from ethylene glycol monopropyl ether, diethylene glycol mono butyl ether or ethylene glycol mono 2-ethylhexyl ether. Embodiments also exist with any one of the foregoing single compounds as a solvent.

Combinations in the Concentrated Antioxidant Solutions

The invention provides for a variety of component selections that allow the delivery of significantly higher concentrations of phenolic antioxidants along with metal chelators. The invention thus includes combinations of the foregoing components to provide concentrated antioxidant solutions. The present invention allows preparation of solutions having high concentrations of phenolic antioxidants, even in the presence of metal chelating compounds. The amount of phenolic antioxidant present in the concentrate solution may be in any desirable range. Some examples include about 10 to about 90 weight %, about 20 to about 90 weight %, about 25 to about 50 weight %, about 22 to about 50 weight %, about 22 to about 40 weight %, about 20 to about 40 weight %, about 20 to about 30 weight %, about 25 to about 40 weight %, about 15 to about 40 weight %, about 15 to about 30 weight %, and about 30 to about 90 weight %, in each case based on the total weight of concentrated solution. Other examples include at least about 15%, greater than 21%, at least about 22%, at least about 23%, at least about 24%, at least about 25%, at least about 30% and at least about 40%. Similarly the amount of metal chelating compound present in the concentrate solution may be in any desirable range. Some examples include about 0.1 to about 10 weight %, about 20 to about 90 weight %, about 25 to about 50 weight %, about 22 to about 50 weight %, about 22 to about 40 weight %, about 20 to about 40 weight %, about 20 to about 30 weight %, about 25 to about 40 weight %, about 15 to about 40 weight %, about 15 to about 30 weight %, and about 30 to about 90 weight %, in each case based on the total weight of concentrated solution. Other examples include at least about 15%, greater than 21%, at least about 22%, at least about 23%, at least about 24%, at least about 25%, at least about 30% and at least about 40%. Where the metal chelating compound is present, it will be present in amounts of at least about 0.5%. Embodiments exist with the above ranges of antioxidant concentrations and several different concentrations of the metal chelating compound, including, for example, about 0.5 to about 20 weight %, about 0.5 to about 10 weight %, about 0.5 to about 5 weight %, 0.5 to about 3 weight % and about 1.0 to about 3 weight %. Thus, for example, in some embodiments of the present invention, the antioxidant concentrate comprises from about 25 to about 40 weight % of an antioxidant and from about 1 to about 3 weight % of a metal chelating compound. In some embodiments of the present invention, the antioxidant concentrate comprises from about 25 to about 40 weight % of an antioxidant and from about 0.5 to about 10 weight % of a metal chelating compound. In some embodiments of the present invention, the antioxidant concentrate comprises at least about 22% of an antioxidant and from about 0.5 to about 3 weight % of a metal chelating compound. In some embodiments of the present invention, the antioxidant concentrate comprises from about 15 to about 40 weight % of an antioxidant and from about 0.5 to about 10 weight %, optionally about 0.5 to about 5%, of a metal chelating compound while containing less than 10% of a surface active agent.

In some embodiments, the antioxidant solution is readily miscible in biodiesel. A readily miscible antioxidant solution is helpful because in some embodiments it allows the solution to become dissolved into the biodiesel with little or no agitation or heating. Whether a solution is "readily miscible" in biodiesel is determined by the following procedure. A clear soy oil biodiesel having a yellowness index of 140 based on ASTM Method E313-05 and containing no suspended particles or visible internal phases is stored at room temperature for at least 24 hours prior to the experiment. 20 grams of the biodiesel is placed into an eight-dram, (1 fluid ounce, approximately 25 ml) screw-top cylindrical glass vial. 0.20 grams of the antioxidant solution to be tested is then added and the vial is immediately sealed with a screw-top stopper and is inverted 180 degrees 5 times. After the fifth inversion the vial is immediately inspected visually, first upright then on its side for evidence of phase separation. If there is any separate phase layer, suspended bodies or particles, haze, or globules of liquid adhering to the inner surface of glass vial, the solution is inverted up to an additional five times. The presence of any separate phase layer, suspended bodies or particles, haze, or globules of liquid adhering to the inner surface of glass vial after 10 inversions indicates that the solution is not "readily miscible" in biodiesel. The absence of all such indicators indicates within 10 inversions or less indicates that the composition is "readily miscible" in biodiesel.

In some embodiments, the selection of components allows preparation of a homogeneous composition that is readily miscible in biodiesel without the use of surface active agents. Thus, in some embodiments, the invention provides a homogeneous composition containing less than 10% total surface active agents by weight. As used throughout this application, "surface active agents" means molecules that are characterized by the possession of both at least one hydrophilic group (polar or ionic) and at least one hydrophobic groups (containing straight or branched chains of 10 or more unsaturated saturated or unsaturated carbons), and that reduce interfacial tension between two liquids, or between liquids and solids. Some examples of surface active agents include fatty acids, salts of fatty acids (e.g. soaps), aminoalcohols ($C_{10}$ and higher), long chain alcohols ($C_{10}$ and higher, and including long chain monoglycerides and diglycerides such as DIMODAN R/D K-A available from Danisco Cultor USA, Inc., New Century, Kans.), and ethoxylated linear alcohols (e.g. TERGITOL 15-S series surfactants available from DOW Chemical).

The type of solvent present in the concentrated antioxidant solution may be selected from a single class of the above specified solvents or may be a mixture of such solvents, depending upon the antioxidant, metal chelating compound, as well as the presence of other additives. In formulating the combinations of components, the solvent or solvent combination is chosen for the phenolic antioxidant and metal chelator in part by taking account of the individual solubilities of the two components. However, it has been found that in some embodiments the presence of the phenolic antioxidant and the metal chelating compound together should be properly considered rather than the individual solubilities of the components. Some embodiments are amenable to single solvent systems. Multiple solvent systems may be used to improve the solubilities of the system components or to modify the other characteristics of the solvent solution.

Glycol ethers (e.g. the $C_2$-$C_{15}$ glycol ethers such as Eastman DB solvent or Eastman EP solvent) and amides (e.g. DMF) are suitable single solvent systems in many embodiments. Low molecular weight alcohols ($C_1$-$C_3$ or $C_1$-$C_3$) are useful in some embodiments, although combinations with other solvents may be more useful for embodiments involving "hindered phenols," or phenolic antioxidants having a plurality branched or long chain alkyl groups, thereby limiting their solubility in the alcohols (e.g. BHT, which has two tert-butyl chains). Also, methanol's utility in biodiesel may be limited due to product specifications.

In some embodiments involving hindered phenols in combination with chelators that are hydroxycarboxylic acids (e.g. citric acid), hydroxycarboxylic acid esters (e.g. triethyl citrate), or aminoalcohols (e.g. triethanolamine), glycol ethers (e.g. $C_2$-$C_{15}$ glycol ethers) and amide solvents are useful in forming single solvent systems. In some embodiments in which the chelator is a polyamine such as ethylenediamine, ketones (e.g. $C_3$-$C_{14}$ ketones such as acetone), esters (e.g. $C_3$-$C_{15}$ esters such as ethyl acetate) nitro-compounds (e.g. nitrobenzene) or ethers (e.g. THF) are useful in achieving higher solubilities with hindered phenols.

In some embodiments in which the antioxidant is a mono-alkylated diphenol (e.g. TBHQ) and the choice of chelator is a carboxylic acid (e.g. citric acid), glycol ethers (e.g. $C_2$-$C_{15}$ glycol ethers), alcohols (e.g. $C_2$-$C_{15}$ glycol ethers), or amides (e.g. DMF) can be used in single solvent systems. In some embodiments in which the antioxidant is a mono-alkylated diphenol (e.g. TBHQ) and the choice of chelator is a carboxylic acid $C_2$-$C_{15}$ glycol ethers are used in single solvent systems. In some embodiments involving mono-alkylated diphenols and a chelator selected from the classes of citric acid esters, aminoalcohols, or diamines, more hydrophobic solvents such as ketones (e.g. $C_3$-$C_{14}$ ketones), esters (e.g. $C_3$-$C_{15}$ esters,) or ethers (e.g. THF) are used in single solvent systems.

In some embodiments, the phenolic antioxidant is a diphenol monoether (e.g. BHA), the chelator is selected from citric acid or its esters, and the single solvent is a glycol ether (e.g. a $C_2$-$C_{15}$ glycol ether), an amide, or an alcohol. In some embodiments, the phenolic antioxidant is a diphenol monoether (e.g. BHA), the chelator is an aminoalcohol, and the single solvent is a nitro-compound (e.g. nitrobenzene). In some embodiments, the phenolic antioxidant is a diphenol monoether (e.g. BHA), the chelator is a polyamine and a multiple solvent system is used.

In some embodiments involving a phenolic antioxidant from the class of triphenols (e.g. pyrogallol) and citric acid, a single solvent is selected from glycol ethers (e.g. $C_2$-$C_{15}$ glycol ethers), and amides (e.g. DMF). In some embodiments involving a triphenol antioxidant and esters of citric acid, the single solvent is selected from ketones (e.g. $C_3$-$C_{14}$ ketones), esters (e.g. $C_3$-$C_{15}$ esters,) and ethers (e.g. THF).

In some embodiments, the compositions have a flash point of higher than 100 degrees Fahrenheit as determined using ASTM Method Number: D3828-05. This can be accomplished, for example, through selection of solvents or solvent combinations that will result in a final composition having the desired flashpoint. Achieving high solubility of phenolic antioxidants in the presence of metal chelators, while maintaining miscibility in biodiesel and a flash point above 100 degrees Fahrenheit, is one of the advantages of some embodiments of this invention. In some embodiments, the composition is (i.e. does not precipitate and separate) stable at cold temperatures (e.g. −25 Degrees F. for seven days).

In some embodiments, the concentrated antioxidant solutions may further include specific functional additives, such as cold flow additives, biocides, engine cleaning agents, surface active agents, compatibilizers, and corrosion inhibitors. In some embodiments, such additives are present in the concentrated solution collectively in an amount of from about 0.001 to about 40 weight %, based on the total weight of concentrated solution. In some embodiments, such additives are present collectively in an amount of from about 0.1 to about 20 weight %, based on the total weight of concentrated solution.

In some embodiments, biodiesel is used as an ester solvent in the antioxidant concentrate solutions. In some embodiments, the concentrate solution comprises from about 15 to about 40 weight % and optionally from about 15 to about 25 weight %, of an antioxidant; from about 5 to about 30 weight % and optionally from about 5 to about 15 weight % of a glycol solvent; from about 0.1 to about 10 weight % and optionally from about 1 to about 2 weight % of a metal chelating compound; from about 10 to about 30 weight % of a surface active agent; and from about 30 to about 60 weight % and optionally from about 40 to about 55 weight % of biodiesel.

Methods of Making Antioxidant Compositions

While the compositions of the present invention can be made by any method. the invention also includes methods of combining one or more solvents, metal chelating compounds, and phenolic antioxidants. It has been discovered that the order of combining the components can affect the concentrations that can be achieved. In some embodiments, fully dissolving a metal chelating compound in a solvent before adding the phenolic antioxidant or combining with a solution containing the phenolic antioxidant results in preparations to which higher concentrations of phenolic antioxidants can be added (without resulting in precipitation of the metal chelator or the phenolic antioxidant) as compared to methods involving simultaneous addition of phenolic antioxidant and metal chelator, or addition of undissolved metal chelator to a solution already containing the phenolic antioxidant. This has been found, for example, in some embodiments in which the metal chelator and phenolic antioxidant have different solubilities.

Specifically, in some embodiments the metal chelating compound is dissolved in a solvent containing one or more compounds to form a first solution, which is then admixed with either the phenolic antioxidant or a second solution containing one or more solvent compounds and the phenolic antioxidant. Other solvent compounds and additives can be optionally combined with the first solution before, during, or after the combination with the phenolic antioxidant or second solution.

In some embodiments, a first solution is prepared containing a phenolic antioxidant in a solvent containing one or more compounds. A second solution is prepared containing a metal chelating compound in one or more solvent compounds. Then a predetermined amount of the second solution is added to the first solution to give a third or final solution having the desired amounts of the antioxidant and metal chelating compound in a solution matrix. Optionally, the first or second solution, or both solutions, are combined with additional solvent compounds prior to mixing with each other.

In some embodiments, a metal chelating compound is first dissolved in a solvent containing one or more compounds to make a first solution. One or more additional solvent compounds is then added to the first solution to form a solvent matrix having the metal chelating compound dissolved in the solvent matrix. Then a phenolic antioxidant is added to the solvent matrix to form the final concentrated solution having the desired amounts of the antioxidant and metal chelating compound in a solution matrix.

In some embodiments, the metal chelating compound is added to a solvent to make a solution. The phenolic antioxidant is then added to the solution.

In each of the foregoing methods, the amounts of each component included may be predetermined such that the method produces any of the compounds of the present invention. Thus, embodiments of the foregoing method exist for each composition of the present invention.

In some embodiments, the components are miscible at room temperature. In some embodiments, it may be appropriate to heat one or more of the precursor solutions to achieve complete dissolution of the solute in the solvent. In some embodiments, the solvent is heated to a temperature of less than about 100° C. and optionally less than about 60° C.

Treated Compositions

The invention also provides fuel compositions that include all of the components of at least one antioxidant concentrate solution of the present invention along with fatty acids or fatty acid esters (including biodiesel). Optionally, additional components may be added. In some embodiments of the present invention, the fuel composition contains from 0.001 to 5 weight %, based on the weight of the composition, of an antioxidant concentrate solution of the present invention and has a concentration of the phenolic antioxidant that is greater than about 5 parts per million (ppm). In some embodiments of the present invention, the fuel composition contains from 0.001 to 1 weight % of the antioxidant concentrate solution based on the weight of the composition. In some embodiments of the present invention, the fuel composition contains from 0.001 to 0.4 weight % of the antioxidant concentrate solution based on the weight of the composition. In some embodiments, the treated composition contains between about 5 and about 1200 ppm phenolic antioxidant by weight. In some embodiments the treated composition contains between about 5 and about 400 ppm phenolic antioxidant by weight. In some embodiments, the treated composition contains between about 30 and about 200 ppm phenolic antioxidant by weight.

The invention further provides fuel compositions that contain blends of treated biodiesel and at least one other burnable fuel source. The treated biodiesel contains the antioxidant concentrate solution as described in the preceding paragraph. As used herein, the term "burnable fuel source" means any fuel source that is capable of combustion and that thermodynamically liberates heat upon combustion or oxidation. Some examples of such burnable fuel sources include petroleum distillates, such as gasoline, petroleum diesel, and jet fuel; coal and coal slurries; natural gas; and hydrogen to name a few. In some embodiments, the burnable fuel source is a petroleum diesel fuel. In some embodiments, the treated biodiesel component of the blended fuel is present in an amount of at least about 2% by weight based on the total weight of the blended fuel. Embodiments exist in which the treated biodiesel is at least about 5%, 10%, 20%, 30% or 50% based on the total weight of the blended fuel. Embodiments also exist in which the treated biodiesel is present in a specified range of concentrations, such as 1-10% by weight, 2-10% by weight 3-8% by weight, 10-20% by weight, 15-25% by weight, or 20-30% by weight.

Uses of the Compositions

The present invention also includes methods of using the antioxidant concentrate compositions of the present invention to increase the oxidative stability of with fatty acids or fatty acid esters (including biodiesel). In some embodiments, from about 0.001 to 5 weight % of the antioxidant concentrate solution is added, based on the overall weight of the treated composition. In some embodiments, the resulting concentration of the antioxidant is greater than about 5 parts per million (ppm), based on the weight of the treated composition. In some embodiments, the concentration of the metal chelating compound is from about 0.1 ppm to about 40 ppm, based on the weight of the treated composition. In some embodiments, the treated composition contains between about 0.25 ppm and about 60 ppm metal chelating compound by weight. In some embodiments, the treated composition contains between about 0.25 and about 20 ppm metal chelating compound by weight. In some embodiments, the treated composition contains between about 1.5 and about 10 ppm metal chelating compound by weight. Any of the antioxidant concentrate solutions of the present invention may be used in this method.

The present invention is illustrated in greater detail by the specific examples presented below. It is to be understood that these examples are illustrative embodiments and are not intended to be limiting of the invention, but rather are to be construed broadly within the scope and content of the appended claims. All parts and percentages in the examples are on a weight basis unless otherwise stated.

EXAMPLES

Several mixtures containing phenolic antioxidants, metal chelating compounds and solvents were prepared. All combinations were prepared at room temperature approximately 25° C. using one of eight modes of preparation, identified as "Prep Modes" in Table 1. "Antioxidant" refers to the phenolic antioxidant used and "Chelator" refers to the metal chelating compound used. All percentages are weight percentages based on the final composition. "Prep Mode" 1 involved using a single solvent in a single vessel. Chelator was first dissolved in Solvent 1, after which phenolic antioxidant was dissolved. "Prep Mode" 2 involved two solvents is a single vessel. Chelator was first dissolved in Solvent 1, followed by the addition of Solvent 2 immediately followed by phenolic antioxidant. "Prep Mode" 3 involved using two solvents and one vessel. Chelator was first dissolved in a mixture of Solvent 1 and Solvent 2, after which the phenolic antioxidant was added. "Prep Mode" 4 involved using two solvents and two vessels. Chelator was dissolved in Solvent 1 in Vessel 1, and phenolic antioxidant was separately dissolved in Solvent 2 in Vessel 2. The separate solutions from Vessels 1 and 2 were then combined. "Prep Mode" 5 involved using three solvents and one vessel. Chelator was dissolved in Solvent 1, followed by additions of Solvent 2 and 3 (in no particular order, and immediately after one another), and then finally the phenolic antioxidant followed Solvents 2 and 3. "Prep Mode" 6 involved three solvents and one vessel. Chelator was dissolved in mixture of Solvent 1 and Solvent 2. Solvent 3 was then added, followed immediately by the phenolic antioxidant. "Prep Mode" 7 involved three solvents and two vessels. Chelator was dissolved in a mixture of Solvent 1 and Solvent 2 in Vessel 1, Phenolic antioxidant was dissolved in Solvent 3 in Vessel 2. The two solutions in Vessel 1 and Vessel 2 were then combined. Some "Prep Mode" 6 and 7 examples did not involve the use of a chelator, so the solvent combinations mentioned did not include chelators. "Prep Mode" 8 involved using a single solvent in a single vessel. Chelator and phenolic antioxidant were added to the solvent immediately after each other (essentially simultaneously). In the above "Prep Mode" descriptions, addition of one component immediately after the other means that time was not taken to assure complete dissolution of the compound added first.

Samples 1-15 were prepared in ambient atmosphere; Examples 16 and up were prepared under a nitrogen atmosphere. The solutions are presented Table 1 below. Solutions were visually inspected after formulation. "Single Phase Soln" indicates whether the sample was free of evidence of precipitation of either phenolic antioxidant or metal chelator upon visual inspection.

Some solutions were tested for cold storage stability, miscibility in biodiesel or flashpoint (or a combination of them). Table 2 contains the data from those tests. Where cold storage stability was tested, it was determined as follows: Twenty grams of the antioxidant solution at ambient temperature was weighed into an 8 dram vial. The vial was placed in a freezer at a temperature of −25 degrees Fahrenheit for seven days. The vials were then removed and visually inspected. Particulate formation, sedimentation, and/or phase separation was considered a failure. Solutions that passed are indicated "Y" in the "Storage Stable" column and solutions that failed are indicated "N."

Whether a solution was considered miscible in biodiesel was determined using the test for determining whether the solution is "readily miscible in biodiesel" as defined herein. A clear soy oil biodiesel having a yellowness index of 140 based on ASTM Method E313-05 and containing no suspended particles or visible internal phases was stored at room temperature for at least 24 hours prior to the experiment. 20 grams of the biodiesel was placed into an eight-dram, (1 fluid ounce, approximately 25 ml) screw-top cylindrical glass vial. 0.20 grams of the antioxidant solution to be tested was then added and the vial was immediately sealed with a screw-top stopper and was inverted 180 degrees 5 times. After the fifth inversion the vial was immediately inspected visually, first upright then on its side for evidence of phase separation. If there was any separate phase layer, suspended bodies or particles, haze, or globules of liquid adhering to the inner surface of glass vial, the solution was inverted up to an additional five times. The presence of any separate phase layer, suspended bodies or particles, haze, or globules of liquid adhering to the inner surface of glass vial after 10 inversions indicates that the solution was not "readily miscible" in biodiesel. The absence of all such indicators indicates within 10 inversions or less indicates that the composition was "readily miscible" in biodiesel. Solutions that were readily miscible are indicated "Y" under "Biodiesel Miscible" in Table 2 if such indicators were absent after only five inversions. For solutions in which the indicators were present after five inversions absent after anywhere above five and up to 10 inversions, the number of inversions that were required to remove the indicators was noted. Solutions that were not "readily miscible are indicated "N."

Flashpoint determinations were made using ASTM Method Number: D3828. In all cases, the absence of data for a specific test in Table 2 indicates that the test in question was not performed.

TABLE 1

| Example No. | Antioxidant | Chelator | Solvent 1 | Solvent 2 | Solvent 3 | Prep Mode | Single Phase Soln |
|---|---|---|---|---|---|---|---|
| 1 | TBHQ (20%) | citric acid (1%) | PM Acetate (79%) | | | 1 | Y |
| 2 | TBHQ (30%) | citric acid (1.5%) | PM Acetate (68.5) | | | 1 | Y |
| 3 | TBHQ (40%) | citric acid (2%) | PM Acetate (58%) | | | 1 | Y |
| 4 | TBHQ (40%) | citric acid (2%) | PM Acetate (58%) | | | 1 | N |
| 5 | TBHQ (20%) | citric acid (1%) | PM Acetate (79%) | | | 1 | N |
| 6 | TBHQ (30%) | citric acid (1.5%) | PM Acetate (60%) | Propylene Glycol (8.5%) | | 3 | N |
| 7 | TBHQ (30%) | citric acid (1.5%) | C-11 (60%) | Propylene Glycol (8.5%) | | 3 | N |
| 8 | TBHQ (30%) | citric acid (1.5%) | KB-3 (60%) | Propylene Glycol (8.5%) | | 3 | N |
| 9 | TBHQ (30%) | citric acid (1.5%) | Propyl Propionate (60%) | Propylene Glycol (8.5%) | | 3 | N |
| 10 | TBHQ (30%) | citric acid (1.5%) | Ethanol (68.5%) | | | 1 | N |
| 11 | TBHQ (30%) | citric acid (1.5%) | Ethanol (18.5%) | KB-3 (50%) | | 3 | N |
| 12 | TBHQ (30% | citric acid (1.5%) | Ethanol (18.5%) | C-11 (50%) | | 3 | N |
| 13 | TBHQ (30%) | citric acid (1.5%) | Ethanol (18.5%) | n-butyl acetate (50%) | | 3 | Y |
| 14 | TBHQ (30%) | citric acid (1.5%) | THF (68.5%) | | | 1 | N |
| 15 | TBHQ (30%) | citric acid (1.5%) | DMF (68.5%) | | | 1 | Y |

TABLE 1-continued

| Example No. | Antioxidant | Chelator | Solvent 1 | Solvent 2 | Solvent 3 | Prep Mode | Single Phase Soln |
|---|---|---|---|---|---|---|---|
| 16 | TBHQ (30%) | citric acid (1.5%) | Ethanol (18.5%) | C-11 (50%) | | 3 | N |
| 17 | TBHQ (30%) | citric acid (1.5%) | PM Acetate (60%) | Propylene Glycol (8.5%) | | 3 | N |
| 18 | TBHQ (30%) | citric acid (1.5%) | PM Acetate (60%) | DMF (8.5%) | | 3 | N |
| 19 | TBHQ (30%) | citric acid (1.5%) | PM Acetate (60%) | DMF (8.5%) | | 3 | N |
| 20 | t-butylcatechol (30%) | citric acid (1.5%) | PM Acetate (60%) | Propylene Glycol (8.5%) | | 3 | Y |
| 21 | TBHQ (30%) | citric acid (1.5%) | PM Acetate (27.7%) | Biodiesel (40.8%) | | 2 | N |
| 22 | TBHQ (30%) | citric acid (1.5%) | Ethanol (27.7%) | Biodiesel (40.8%) | | 2 | Y |
| 23 | 2,6-di-t-butylphenol (25%) | citric acid (1.5%) | Ethanol (27.7%) | Biodiesel (40.8%) | | 2 | |
| 24 | t-butylcatechol (30%) | citric acid (1.5%) | Ethanol (27.7%) | Biodiesel (40.8%) | | 2 | Y |
| 25 | TBHQ (30%) | triethyl citrate (1.5%) | Ethanol (27.7%) | Biodiesel (40.8%) | | 2 | Y |
| 26 | TBHQ (30%) | N,N-disalicylidene-1,2-propanediamine (1.5%) | Propylene Glycol (8.5%) | PM Acetate (60%) | | 2 | N |
| 27 | Guaiacol (CTMME)(30%) | citric acid (1.5%) | Propylene Glycol (8.5%) | PM Acetate (60%) | | 2 | Y |
| 28 | TBHQ (30%) | Monostearyl Citrate (1.5%) | PM Acetate (60%) | Propylene Glycol (8.5%) | | 3 | N |
| 29 | Propyl Gallate (30%) | citric acid (1.5%) | PM Acetate (60%) | Propylene Glycol (8.5%) | | 3 | N |
| 30 | Propyl Gallate (30%) | citric acid (1.5%) | Ethanol (27.7%) | Biodiesel (40.8%) | | 2 | N |
| 31 | Guaiacol (CTMME)(30%) | citric acid (1.5%) | Ethanol (27.7%) | Biodiesel (40.8%) | | 2 | Y |
| 32 | TBHQ (30%) | triethylcitrate (1.5%) | Propylene Glycol (8.5%) | PM Acetate (60%) | | 2 | Y |
| 33 | BHT (30%) | citric acid (1.5%) | Propylene Glycol (8.5%) | PM Acetate (60%) | | 3 | |
| 34 | DTBHQ (30%) | citric acid (1.5%) | PM Acetate (60%) | Propylene Glycol (8.5%) | | 3 | N |
| 35 | THQ (30%) | citric acid (1.5%) | Propylene Glycol (8.5%) | PM Acetate (60%) | | 3 | N |
| 36 | Pyrogallol (30%) | citric acid (1.5%) | Propylene Glycol (8.5%) | PM Acetate (60%) | | 3 | Y |
| 37 | TBHQ (30%) | citric acid (1.5%) | Propylene Glycol (18.5%) | PM Acetate (50%) | | 2 | N |
| 38 | TBHQ (30%) | citric acid (1.5%) | Propylene Glycol (10%) | PM Acetate (30%) | Biodiesel (28.5%) | 5 | N |
| 39 | TBHQ (30%) | citric acid (1.5%) | PM Acetate (38.5%) | Biodiesel (30%) | | 2 | N |
| 40 | TBHQ (30%) | citric acid (1.5%) | Propylene Glycol(15%) | PM Acetate (35%) | Biodiesel (18.5%) | 5 | N |
| 41 | TBHQ (30%) | Monostearyl Citrate (1.5%) | Ethanol (27.7%) | Biodiesel (40.8%) | | 2 | N |
| 42 | TBHQ (30%) | N,N-disalicylidene-1,2-propanediamine (1.5%) | Ethanol (27.7%) | Biodiesel (40.8%) | | 2 | N |
| 43 | DOH (30%) | citric acid (1.5%) | Ethanol (27.7%) | Biodiesel (40.8%) | | 2 | N |
| 44 | DTBHQ (30%) | citric acid (1.5%) | Ethanol (27.7%) | Biodiesel (40.8%) | | 2 | N |
| 45 | HQ (30%) | citric acid (1.5%) | Ethanol (27.7%) | Biodiesel (40.8%) | | 2 | N |
| 46 | BHT (30%) | citric acid (1.5%) | Ethanol (27.7%) | Biodiesel (40.8%) | | 2 | N |
| 47 | Catechol (30%) | citric acid (1.5%) | Ethanol (27.7%) | Biodiesel (40.8%) | | 2 | N |
| 48 | HQMME (30%) | citric acid (1.5%) | Ethanol (27.7%) | Biodiesel (40.8%) | | 2 | N |
| 49 | THQ (30%) | citric acid (1.5%) | Ethanol (27.7%) | Biodiesel (40.8%) | | 2 | N |
| 50 | Pyrogallol (30%) | citric acid (1.5%) | Ethanol (27.7%) | Biodiesel (40.8%) | | 2 | N |
| 51 | BHA (30%) | citric acid (1.5%) | Ethanol (27.7%) | Biodiesel (40.8%) | | 2 | N |

TABLE 1-continued

| Example No. | Antioxidant | Chelator | Solvent 1 | Solvent 2 | Solvent 3 | Prep Mode | Single Phase Soln |
|---|---|---|---|---|---|---|---|
| 52 | DOH (30%) | citric acid (1.5%) | Propylene Glycol (8.5%) | PM Acetate (60%) | | 2 | N |
| 53 | Catechol (30%) | citric acid (1.5%) | Propylene Glycol (8.5%) | PM Acetate (60%) | | 2 | N |
| 54 | HQ (30%) | citric acid (1.5%) | Propylene Glycol (8.5%) | PM Acetate (60%) | | 2 | N |
| 55 | HQMME (30%) | citric acid (1.5%) | Propylene Glycol (8.5%) | PM Acetate (60%) | | 2 | |
| 56 | BHA (30%) | citric acid (1.5%) | Propylene Glycol (8.5%) | PM Acetate (60%) | | 2 | N |
| 57 | TBHQ (30%) | citric acid (1.5%) | Propylene Glycol (20%) | PM Acetate (40%) | Biodiesel (8.5%) | 5 | N |
| 58 | TBHQ (24%)/ DTBHQ (6%) | citric acid (1.5%) | Propylene Glycol (8.5%) | PM Acetate (60%) | | 5 | Y |
| 59 | TBHQ (18%)/ DTBHQ (12%) | citric acid (1.5%) | Propylene Glycol (8.5%) | PM Acetate (60%) | | 2 | Y |
| 60 | TBHQ (24%)/ DTBHQ (6%) | citric acid (1.5%) | Ethanol (27.7%) | Biodiesel (40.8%) | | 2 | N |
| 61 | TBHQ (18%)/ DTBHQ (12%) | citric acid (1.5%) | Ethanol (27.7%) | Biodiesel (40.8%) | | 2 | N |
| 62 | TBHQ (30%) | citric acid (1.5%) | Propylene Glycol (18.5%) | n-butylacetate (50%) | | 2 | Y |
| 63 | TBHQ (30%) | citric acid (1.5%) | Propylene Glycol (16.5%) | n-butylacetate (52%) | | 2 | N |
| 64 | TBHQ (30%) | citric acid (1.5%) | Propylene Glycol (13.5%) | n-butylacetate (55%) | | 2 | N |
| 65 | TBHQ (30%) | citric acid (1.5%) | Propylene Glycol (11%) | n-butylacetate (57.5%) | | 2 | N |
| 66 | TBHQ (30%) | citric acid (1.5%) | Propylene Glycol (8.5%) | n-butylacetate (60%) | | 2 | N |
| 67 | HQ (30%) | citric acid (1.5%) | Isopropanol (68.5%) | | | 1 | N |
| 68 | Propyl Gallate (30%) | citric acid (1.5%) | Isopropanol (68.5%) | | | 1 | N |
| 69 | DTBHQ (30%) | citric acid (1.5%) | Isopropanol (68.5%) | | | 1 | N |
| 70 | HQ (30%) | citric acid (1.5%) | Acetone (68.5%) | | | 1 | N |
| 71 | Propyl Gallate (30%) | citric acid (1.5%) | Acetone (68.5%) | | | 1 | N |
| 72 | DTBHQ (30%) | citric acid (1.5%) | Acetone (68.5%) | | | 1 | N |
| 73 | HQ (20%) | citric acid (1%) | Isopropanol (79%) | | | 1 | N |
| 74 | DTBHQ (20%) | citric acid (1%) | Isopropanol (79%) | | | 1 | N |
| 75 | TBHQ (30%) | citric acid (1.5%) | Propylene Glycol (15%) | PM Acetate (53.5%) | | 2 | N |
| 76 | TBHQ (30%) | Monostearyl Citrate (1.5%) | Propylene Glycol (18.5%) | n-butylacetate (50%) | | 2 | N |
| 77 | TBHQ (30%) | Monostearyl Citrate (1.5%) | Biodiesel (18.5%) | n-butylacetate (50%) | | 2 | N |
| 78 | TBHQ (30%) | citric acid (1.5%) | Propylene Glycol (15%) | n-butylacetate (53.5%) | | 2 | N |
| 79 | TBHQ (30%) | citric acid (1.5%) | Propylene Glycol (16.5%) | methyl acetate (52%) | | 2 | N |
| 80 | TBHQ (30%) | citric acid (1.5%) | DMF (15%) | n-butylacetate (53.5%) | | 2 | N |
| 81 | TBHQ (30%) | citric acid (1.5%) | Ethanol (15%) | n-butylacetate (53.5%) | | 2 | N |
| 82 | TBHQ (30%) | citric acid (1.5%) | PM Acetate (15%) | n-butylacetate (53.5%) | | 2 | N |
| 83 | TBHQ (30%) | citric acid (1.5%) | THF (15%) | n-butylacetate (53.5%) | | 2 | N |
| 84 | TBHQ (30%) | citric acid (1.5%) | Isopropanol (15%) | n-butylacetate (53.5%) | | 2 | N |
| 85 | TBHQ (30%) | citric acid (1.5%) | Propylene Glycol (15%) | EP Solvent (53.5%) | | 2 | Y |
| 86 | TBHQ (30%) | citric acid (1.5%) | Propylene Glycol (15%) | DM Solvent (53.5%) | | 2 | Y |
| 87 | TBHQ (30%) | citric acid (1.5%) | Propylene Glycol (15%) | EB Solvent (53.5%) | | 2 | Y |
| 88 | TBHQ (30%) | citric acid (1.5%) | EB Solvent (15%) | n-butylacetate (53.5%) | | 2 | N |
| 89 | TBHQ (30%) | citric acid (1.5%) | Propylene Glycol (15%) | Isopropanol (53.5%) | | 2 | N |

TABLE 1-continued

| Example No. | Antioxidant | Chelator | Solvent 1 | Solvent 2 | Solvent 3 | Prep Mode | Single Phase Soln |
|---|---|---|---|---|---|---|---|
| 90 | TBHQ (30%) | citric acid (1.5%) | EB Solvent (15%) | Isopropanol (53.5%) | | 2 | N |
| 91 | TBHQ (30%) | citric acid (1.5%) | PM Acetate (18.5%) | n-butylacetate (50%) | | 4 | N |
| 92 | TBHQ (30%) | citric acid (1.5%) | PM Acetate (11%) | DMF (4%) | n-butylacetate (53.5%) | 7 | N |
| 93 | TBHQ (18%)/DTBHQ (12%) | citric acid (1.5%) | Propylene Glycol (15%) | n-butylacetate (53.5%) | | 4 | N |
| 94 | TBHQ (18%)/DTBHQ (12%) | citric acid (1.5%) | DB Solvent (11%) | DMF (4%) | n-butylacetate (53.5%) | 7 | N |
| 95 | TBHQ (30%) | citric acid (1.5%) | PM Acetate (11%) | Isopropanol (4%) | n-butylacetate (53.5%) | 7 | N |
| 96 | TBHQ (30%) | citric acid (1.5%) | DB Solvent (11%) | Isopropanol (4%) | n-butylacetate (53.5%) | 7 | N |
| 97 | TBHQ (30%) | citric acid (1.5%) | Propylene Glycol (11%) | Isopropanol (4%) | n-butylacetate (53.5%) | 7 | N |
| 98 | TBHQ (30%) | citric acid (1.5%) | Propylene Glycol (15%) | DB Solvent (53.5%) | | 4 | Y |
| 99 | TBHQ (30%) | citric acid (1.5%) | Propylene Glycol (11%) | DB Solvent (57.5%) | | 4 | Y |
| 100 | TBHQ (30%) | citric acid (1.5%) | Propylene Glycol (7%) | DB Solvent (61.5%) | | 4 | N |
| 101 | TBHQ (30%) | citric acid (1.5%) | Propylene Glycol (11%) | DB Solvent (4%) | n-butylacetate (53.5%) | 7 | Y |
| 102 | TBHQ (30%) | citric acid (1.5%) | DB Solvent (8%) | Propylene Glycol (7%) | n-butylacetate (53.5%) | 7 | Y |
| 103 | TBHQ (30%) | citric acid (1.5%) | EP Solvent (8%) | Propylene Glycol (7%) | n-butylacetate (53.5%) | 7 | N |
| 104 | TBHQ (30%) | citric acid (1.5%) | DB Solvent (8%) | Propylene Glycol (7%) | n-butylacetate (53.5%) | 7 | Y |
| 105 | BHT (30%) | citric acid (1.5%) | DB Solvent (8%) | Propylene Glycol (7%) | n-butylacetate (53.5%) | 7 | Y |
| 106 | TBHQ (30%) | citric acid (1.5%) | DB Solvent (8%) | Propylene Glycol (7%) | n-butylacetate (53.5%) | 7 | Y |
| 107 | TBHQ (22.5%)/DTBHQ (7.5%) | citric acid (1.5%) | DB Solvent (8%) | Propylene Glycol (7%) | n-butylacetate (53.5%) | 7 | Y |
| 108 | TBHQ (30%) | citric acid (1.5%) | DB Solvent (18%) | Propylene Glycol (7%) | n-butylacetate (43.5%) | 7 | Y |
| 109 | BHT (30%) | citric acid (1.5%) | DB Solvent (8%) | Propylene Glycol (7%) | n-butylacetate (53.5%) | 7 | N |
| 110 | BHT (30%) | citric acid (1.5%) | DB Solvent (18%) | Propylene Glycol (7%) | n-butylacetate (43.5%) | 7 | N |
| 111 | TBHQ (30%) | citric acid (1.5%) | DB Solvent (43.5%) | Propylene Glycol (7%) | n-butylacetate (18%) | 7 | Y |
| 112 | TBHQ (30%) | citric acid (1.5%) | DB Solvent (28%) | Propylene Glycol (7%) | n-butylacetate (33.5%) | 7 | Y |
| 113 | TBHQ (30%) | citric acid (1.5%) | DB Solvent (23%) | Propylene Glycol (7%) | n-butylacetate (38.5%) | 7 | Y |
| 114 | TBHQ (30%) | citric acid (1.5%) | DB Solvent (38%) | Propylene Glycol (7%) | n-butylacetate (23.5%) | 7 | Y |
| 115 | TBHQ (30%) | citric acid (1%) | DB Solvent (38%) | Propylene Glycol (7%) | n-butylacetate (24%) | 7 | Y |
| 116 | BHT (30%) | citric acid (1.5%) | Propylene Glycol (8.5%) | PM Acetate (60%) | | 4 | Y |
| 117 | TBHQ (22.5%)/DTBHQ (7.5%) | citric acid (1.5%) | Propylene Glycol (8.5%) | PM Acetate (60%) | | 4 | Y |
| 118 | BHT (30%) | citric acid (1.5%) | DB Solvent (38%) | Propylene Glycol (7%) | n-butylacetate (23.5%) | 7 | Y |
| 119 | TBHQ (22.5%)/DTBHQ (7.5%) | citric acid (1.5%) | DB Solvent (38%) | Propylene Glycol (7%) | n-butylacetate (23.5%) | 7 | Y |
| 120 | TBHQ (30%) | citric acid (1.5%) | DB Solvent (38%) | Propylene Glycol (7%) | MIBK (23.5%) | 7 | Y |
| 121 | TBHQ (30%) | citric acid (1.5%) | Propylene Glycol (15%) | MIBK (53.5%) | | 4 | Y |
| 122 | Propyl Gallate (30%) | citric acid (1.5%) | DB Solvent (38%) | Propylene Glycol (7%) | n-butylacetate (23.5%) | 6 | Y |
| 123 | HQ (30%) | citric acid (1.5%) | DB Solvent (38%) | Propylene Glycol (7%) | n-butylacetate (23.5%) | 6 | N |
| 124 | BKF (30%) | citric acid (1.5%) | DB Solvent (38%) | Propylene Glycol (7%) | n-butylacetate (23.5%) | 6 | Y |
| 125 | TBHQ (30%) | citric acid (1.5%) | DB Solvent (38%) | Propylene Glycol (7%) | 1-nitropropane (23.5%) | 6 | Y |
| 126 | TBHQ (30%) | citric acid (1.5%) | DB Solvent (38%) | Propylene Glycol (7%) | 1-nitrobenzene (23.5%) | 6 | Y |

TABLE 1-continued

| Example No. | Antioxidant | Chelator | Solvent 1 | Solvent 2 | Solvent 3 | Prep Mode | Single Phase Soln |
|---|---|---|---|---|---|---|---|
| 127 | TBHQ (30%) | citric acid (1.5%) | DB Solvent (38%) | Decyl Alcohol (7%) | n-butylacetate (23.5%) | 6 | Y |
| 128 | TBHQ (30%) | citric acid (1.5%) | DB Solvent (38%) | Mixed Glycols-90 (7%) | n-butylacetate (23.5%) | 6 | Y |
| 129 | TBHQ (30%) | citric acid (1.5%) | DTE Solvent (38%) | Propylene Glycol (7%) | n-butylacetate (23.5%) | 6 | Y |
| 130 | TBHQ (30%) | citric acid (1.5%) | DTP Solvent (38%) | Propylene Glycol (7%) | n-butylacetate (23.5%) | 6 | Y |
| 131 | TBHQ (30%) | citric acid (1.5%) | DP Solvent (38%) | Propylene Glycol (7%) | n-butylacetate (23.5%) | 6 | Y |
| 132 | TBHQ (30%) |  | DB Solvent (38%) | Propylene Glycol (7%) | n-butylacetate (25%) | 6 | Y |
| 133 | TBHQ (30%) | citric acid (1.5%) | DB Solvent (38%) | PEG 400 (7%) | n-butylacetate (23.5%) | 6 | Y |
| 134 | TBHQ (30%) |  | DB Solvent (38%) | Decyl Alcohol (7%) | n-butylacetate (25%) | 6 | Y |
| 135 | TBHQ (30%) | citric acid (1.5%) | DB Solvent (38%) | Ethylene Glycol (7%) | methyl acetate (23.5%) | 6 | Y |
| 136 | TBHQ (30%) | citric acid (1.5%) | EEH Solvent (38%) | 1-Octadecanol (7%) | Biodiesel (23.5%) | 6 | N |
| 137 | Pyrogallol (30%) | citric acid (1.5%) | DB Solvent (38%) | Propylene Glycol (7%) | n-butylacetate (23.5%) | 6 | Y |
| 138 | BHA (30%) | citric acid (1.5%) | DB Solvent (38%) | Propylene Glycol (7%) | n-butylacetate (23.5%) | 6 | Y |
| 139 | TBHQ (30%) | citric acid (1.5%) | DB Solvent (38%) | Propylene Glycol (7%) | Acetone (23.5%) | 6 | Y |
| 140 | TBHQ (30%) | citric acid (1.5%) | PM Solvent (38%) | Ethylene Glycol (7%) | methyl acetate (23.5%) | 6 | Y |
| 141 | TBHQ (30%) | citric acid (1.5%) | EEH Solvent (38%) | Propylene Glycol (7%) | n-butylacetate (23.5%) | 6 | Y |
| 142 | TBHQ (30%) | citric acid (1.5%) | DB Solvent (38%) | 1-Octadecanol (7%) | n-butylacetate (23.5%) | 6 | N |
| 143 | THQ (30%) | citric acid (1.5%) | DB Solvent (38%) | Propylene Glycol (7%) | n-butylacetate (23.5%) | 6 | Y |
| 144 | Catechol (30%) | citric acid (1.5%) | DB Solvent (38%) | Propylene Glycol (7%) | n-butylacetate (23.5%) | 6 | Y |
| 145 | Guaiacol (30%) | citric acid (1.5%) | DB Solvent (38%) | Propylene Glycol (7%) | n-butylacetate (23.5%) | 6 | Y |
| 146 | TBHQ (30%) | citric acid (1.5%) | DB Solvent (38%) | 2-Octyl-1-dodecanol (7%) | n-butylacetate (23.5%) | 6 | Y |
| 147 | t-butylcatechol (30%) | citric acid (1.5%) | DB Solvent (38%) | Propylene Glycol (7%) | n-butylacetate (23.5%) | 6 | Y |
| 148 | 2,6-Di-t-butylphenol (30%) | citric acid (1.5%) | DB Solvent (38%) | Propylene Glycol (7%) | n-butylacetate (23.5%) | 6 | Y |
| 149 | HQMME (30%) | citric acid (1.5%) | DB Solvent (38%) | Propylene Glycol (7%) | n-butylacetate (23.5%) | 6 | Y |
| 150 | HQ (30%) |  | DB Solvent (38%) | Propylene Glycol (7%) | n-butylacetate (25%) | 6 | N |
| 151 | BHA (30%) |  | DB Solvent (38%) | Propylene Glycol (7%) | n-butylacetate (25%) | 6 | Y |
| 152 | Propyl Gallate (30%) |  | DB Solvent (38%) | Propylene Glycol (7%) | n-butylacetate (25%) | 6 | Y |
| 153 | BHT (30%) |  | DB Solvent (38%) | Propylene Glycol (7%) | n-butylacetate (25%) | 6 | Y |
| 154 | TBHQ (30%) | citric acid (1.5%) | DB Solvent (68.5%) |  |  | 1 | Y |
| 155 | TBHQ (30%) | citric acid (1.5%) | EP Solvent (68.5%) |  |  | 1 | Y |
| 156 | BHT (30%) | citric acid (1.5%) | DB Solvent (68.5%) |  |  | 1 | Y |
| 157 | BHT (30%) | citric acid (1.5%) | EP Solvent (68.5%) |  |  | 1 | Y |
| 158 | BHT (30%) | citric acid (1.5%) | PM Acetate (68.5%) |  |  | 1 | N |
| 159 | BHT (30%) | citric acid (1.5%) | DMF (68.5%) |  |  | 1 | Y |
| 160 | BHA (30%) | citric acid (1.5%) | DB Solvent (68.5%) |  |  | 1 | Y |
| 161 | BHA (30%) | citric acid (1.5%) | EP Solvent (68.5%) |  |  | 1 | Y |
| 162 | BHA (30%) | citric acid (1.5%) | PM Acetate (68.5%) |  |  | 1 | N |
| 163 | BHA (30%) | citric acid (1.5%) | DMF (68.5%) |  |  | 1 | Y |
| 164 | Propyl Gallate (30%) | citric acid (1.5%) | DB Solvent (68.5%) |  |  | 1 | Y |

TABLE 1-continued

| Example No. | Antioxidant | Chelator | Solvent 1 | Solvent 2 | Solvent 3 | Prep Mode | Single Phase Soln |
|---|---|---|---|---|---|---|---|
| 165 | Propyl Gallate (30%) | citric acid (1.5%) | EP Solvent (68.5%) | | | 1 | N |
| 166 | Propyl Gallate (30%) | citric acid (1.5%) | PM Acetate (68.5%) | | | 1 | N |
| 167 | Propyl Gallate (30%) | citric acid (1.5%) | DMF (68.5%) | | | 1 | N |
| 168 | TBHQ (30%) | citric acid (1.5%) | Ethyl Acetate (68.5%) | | | 1 | N |
| 169 | TBHQ (30%) | citric acid (1.5%) | THF (68.5%) | | | 1 | N |
| 170 | TBHQ (30%) | citric acid (1.5%) | KB-3 (68.5%) | | | 1 | N |
| 171 | TBHQ (30%) | citric acid (1.5%) | Nitrobenzene (68.5%) | | | 1 | N |
| 172 | TBHQ (30%) | citric acid (1.5%) | 1-Nitropropane (68.5%) | | | 1 | N |
| 173 | TBHQ (30%) | citric acid (1.5%) | n-butylacetate (68.5%) | | | 1 | N |
| 174 | TBHQ (30%) | citric acid (1.5%) | Isopropanol (68.5%) | | | 1 | N |
| 175 | Pyrogallol (30%) | citric acid (1.5%) | EP Solvent (68.5%) | | | 1 | Y |
| 176 | Pyrogallol (30%) | citric acid (1.5%) | DMF (68.5%) | | | 1 | Y |
| 177 | TBHQ (30%) | citric acid (1.5%) | Acetone (68.5%) | | | 1 | N |
| 178 | TBHQ (30%) | citric acid (1.5%) | MAK (68.5%) | | | 1 | N |
| 179 | TBHQ (30%) | ethylenediamine (1.5%) | DMF (68.5%) | | | 1 | Y |
| 180 | TBHQ (30%) | ethylenediamine (1.5%) | Isopropanol (68.5%) | | | 1 | Y |
| 181 | TBHQ (30%) | ethylenediamine (1.5%) | EP Solvent (68.5%) | | | 1 | Y |
| 182 | TBHQ (30%) | triethyl citrate (1.5%) | DMF (68.5%) | | | 1 | Y |
| 183 | TBHQ (30%) | triethyl citrate (1.5%) | Isopropanol (68.5%) | | | 1 | Y |
| 184 | TBHQ (30%) | triethyl citrate (1.5%) | EP Solvent (68.5%) | | | 1 | Y |
| 185 | BHA (30%) | triethyl citrate (1.5%) | DMF (68.5%) | | | 1 | Y |
| 186 | BHA (30%) | triethyl citrate (1.5%) | Isopropanol (68.5%) | | | 1 | Y |
| 187 | BHA (30%) | triethyl citrate (1.5%) | EP Solvent (68.5%) | | | 1 | Y |
| 188 | t-butylcatechol (30%) | ethylenediamine (1.5%) | DMF (68.5%) | | | 1 | Y |
| 189 | t-butylcatechol (30%) | ethylenediamine (1.5%) | Isopropanol (68.5%) | | | 1 | N |
| 190 | t-butylcatechol (30%) | ethylenediamine (1.5%) | EP Solvent (68.5%) | | | 1 | N |
| 191 | t-butylcatechol (30%) | triethyl citrate (1.5%) | DMF (68.5%) | | | 1 | Y |
| 192 | t-butylcatechol (30%) | triethyl citrate (1.5%) | Isopropanol (68.5%) | | | 1 | Y |
| 193 | t-butylcatechol (30%) | triethyl citrate (1.5%) | EP Solvent (68.5%) | | | 1 | Y |
| 194 | BHT (30%) | ethylenediamine (1.5%) | DMF (68.5%) | | | 1 | Y |
| 195 | BHT (30%) | ethylenediamine (1.5%) | Isopropanol (68.5%) | | | 1 | N |
| 196 | BHT (30%) | ethylenediamine (1.5%) | EP Solvent (68.5%) | | | 1 | Y |
| 197 | BHT (30%) | triethyl citrate (1.5%) | DMF (68.5%) | | | 1 | Y |
| 198 | BHT (30%) | triethyl citrate (1.5%) | Isopropanol (68.5%) | | | 1 | N |
| 199 | BHT (30%) | triethyl citrate (1.5%) | EP Solvent (68.5%) | | | 1 | Y |
| 200 | BHA (30%) | ethylenediamine (1.5%) | DMF (68.5%) | | | 1 | N |
| 201 | BHA (30%) | ethylenediamine (1.5%) | Isopropanol (68.5%) | | | 1 | N |
| 202 | BHA (30%) | ethylenediamine (1.5%) | EP Solvent (68.5%) | | | 1 | N |
| 203 | TBHQ (25%) | ethylenediamine (1.25%) | Ethyl Acetate (73.75%) | | | 1 | Y |
| 204 | TBHQ (25%) | ethylenediamine (1.25%) | Acetone (73.75%) | | | 1 | Y |
| 205 | TBHQ (25%) | ethylenediamine (1.25%) | Nitrobenzene (73.75%) | | | 1 | N |

TABLE 1-continued

| Example No. | Antioxidant | Chelator | Solvent 1 | Solvent 2 | Solvent 3 | Prep Mode | Single Phase Soln |
|---|---|---|---|---|---|---|---|
| 206 | TBHQ (25%) | ethylenediamine (1.25%) | THF (73.75%) | | | 1 | Y |
| 207 | BHT (25%) | ethylenediamine (1.25%) | Ethyl Acetate (73.75%) | | | 1 | Y |
| 208 | BHT (25%) | ethylenediamine (1.25%) | Acetone (73.75%) | | | 1 | Y |
| 209 | BHT (25%) | ethylenediamine (1.25%) | Nitrobenzene (73.75%) | | | 1 | Y |
| 210 | BHT (25%) | ethylenediamine (1.25%) | THF (73.75%) | | | 1 | Y |
| 211 | TBHQ (25%) | triethyl citrate (1.25%) | Ethyl Acetate (73.75%) | | | 1 | Y |
| 212 | TBHQ (25%) | triethyl citrate (1.25%) | Acetone (73.75%) | | | 1 | Y |
| 213 | TBHQ (25%) | triethyl citrate (1.25%) | Nitrobenzene (73.75%) | | | 1 | N |
| 214 | TBHQ (25%) | triethyl citrate (1.25%) | THF (73.75%) | | | 1 | Y |
| 215 | TBHQ (30%) | triethanolamine (1.5%) | DMF (68.5%) | | | 1 | Y |
| 216 | TBHQ (30%) | triethanolamine (1.5%) | Isopropanol (68.5%) | | | 1 | Y |
| 217 | TBHQ (30%) | triethanolamine (1.5%) | EP Solvent (68.5%) | | | 1 | Y |
| 218 | t-butylcatechol (30%) | triethanolamine (1.5%) | DMF (68.5%) | | | 1 | Y |
| 219 | t-butylcatechol (30%) | triethanolamine (1.5%) | Isopropanol (68.5%) | | | 1 | Y |
| 220 | t-butylcatechol (30%) | triethanolamine (1.5%) | EP Solvent (68.5%) | | | 1 | Y |
| 221 | BHT (30%) | triethanolamine (1.5%) | DMF (68.5%) | | | 1 | Y |
| 222 | BHT (30%) | triethanolamine (1.5%) | Isopropanol (68.5%) | | | 1 | N |
| 223 | BHT (30%) | triethanolamine (1.5%) | EP Solvent (68.5%) | | | 1 | Y |
| 224 | BHA (30%) | triethanolamine (1.5%) | DMF (68.5%) | | | 1 | Y |
| 225 | BHA (30%) | triethanolamine (1.5%) | Isopropanol (68.5%) | | | 1 | Y |
| 226 | BHA (30%)) | triethanolamine (1.5%) | EP Solvent (68.5%) | | | 1 | Y |
| 227 | TBHQ (25%) | triethanolamine (1.25%) | Ethyl Acetate (73.75%) | | | 1 | Y |
| 228 | TBHQ (25%) | triethanolamine (1.25%) | Acetone (73.75%) | | | 1 | Y |
| 229 | TBHQ (25%) | triethanolamine (1.25%) | Nitrobenzene (73.75%) | | | 1 | N |
| 230 | TBHQ (25%) | triethanolamine (1.25%) | THF (73.75%) | | | 1 | Y |
| 231 | BHA (25%) | triethanolamine (1.25%) | Ethyl Acetate (73.75%) | | | 1 | N |
| 232 | BHA (25%) | triethanolamine (1.25%) | Acetone (73.75%) | | | 1 | N |
| 233 | BHA (25%) | triethanolamine (1.25%) | Nitrobenzene (73.75%) | | | 1 | Y |
| 234 | BHA (25%) | triethanolamine (1.25%) | THF (73.75%) | | | 1 | N |
| 235 | Pyrogallol (25%) | triethyl citrate (1.25%) | Ethyl Acetate (73.75%) | | | 1 | Y |
| 236 | Pyrogallol (25%) | triethyl citrate (1.25%) | Acetone (73.75%) | | | 1 | Y |
| 237 | Pyrogallol (25%) | triethyl citrate (1.25%) | Nitrobenzene (73.75%) | | | 1 | N |
| 238 | Pyrogallol (25%) | triethyl citrate (1.25%) | THF (73.75%) | | | 1 | Y |
| 239 | Pyrogallol (30%) | triethyl citrate (1.5%) | DMF (68.5%) | | | 1 | Y |
| 240 | Pyrogallol (30%) | triethyl citrate (1.5%) | Isopropanol (68.5%) | | | 1 | Y |
| 241 | Pyrogallol (30%) | triethyl citrate (1.5%) | EP Solvent (68.5%) | | | 1 | Y |
| 242 | Pyrogallol (30%) | ethylenediamine (1.5%) | DMF (68.5%) | | | 1 | Y |
| 243 | Pyrogallol (30%) | ethylenediamine (1.5%) | Isopropanol (68.5%) | | | 1 | N |
| 244 | Pyrogallol (30%) | ethylenediamine (1.5%) | EP Solvent (68.5%) | | | 1 | Y |
| 245 | Pyrogallol (30%) | triethanolamine (1.5%) | DMF (68.5%) | | | 1 | Y |
| 246 | Pyrogallol (30%) | triethanolamine (1.5%) | Isopropanol (68.5%) | | | 1 | Y |

TABLE 1-continued

| Example No. | Antioxidant | Chelator | Solvent 1 | Solvent 2 | Solvent 3 | Prep Mode | Single Phase Soln |
|---|---|---|---|---|---|---|---|
| 247 | Pyrogallol (30%) | triethanolamine (1.5%) | EP Solvent (68.5%) | | | 1 | Y |
| 248 | BHT (8%) | Citric Acid (2%) | Ethanol (90%) | | | 8 | Y |
| 249 | BHA (8%) | Citric Acid (2%) | Ethanol (90%) | | | 8 | Y |
| 250 | BHT (15%) | Citric Acid (1.5%) | Ethanol (83.5%) | | | 8 | Y |
| 251 | BHA (15%) | Citric Acid (1.5%) | Ethanol (83.5%) | | | 8 | Y |
| 252 | BHT (30%) | Citric Acid (1.5%) | Ethanol (68.5%) | | | 8 | N |
| 253 | BHA (30%) | Citric Acid (1.5%) | Ethanol (68.5%) | | | 8 | Y |
| 254 | BHT (22.5%) | Citric Acid (1.5%) | Ethanol (76%) | | | 8 | N |
| 255 | BHT (25%) | Citric Acid (1.5%) | Ethanol (73.5%) | | | 8 | N |
| 256 | t-butylcatechol (30%) | | DB Solvent (38%) | Propylene Glycol (7%) | n-butylacetate (25%) | 7 | Y |
| 257 | TBHQ (30%) | Citric Acid (0.5%) | DB Solvent (69.5%) | | | 1 | Y |
| 258 | TBHQ (30%) | Citric Acid (1.0%) | DB Solvent (69.0%) | | | 1 | Y |
| 259 | Pyrogallol (30%) | | DB Solvent (38%) | Propylene Glycol (7%) | n-butylacetate (25%) | 7 | Y |
| 260 | Pyrogallol (30%) | Citric Acid (1.5%) | Ethanol (68.5%) | | | 1 | Y |
| 261 | TBHQ (20%) | Citric Acid (1.5%) | Ethanol (78.5%) | | | 1 | Y |
| 262 | TBHQ (10%) | Citric Acid (1.5%) | Ethanol (88.5%) | | | 1 | Y |
| 263 | t-butylcatechol (30%) | Citric Acid (1.5%) | Isopropanol (68.5%) | | | 1 | Y |
| 264 | t-butylcatechol (30%) | Citric acid (1.5%) | Ethanol (68.5%) | | | 1 | Y |

C-11 and KB-3 were mixtures of ketone byproducts from certain ketone processes.

TABLE 2

| Example Number | Cold Storage Eval. | Cold Storage Stable | Biodiesel Miscible | Flashpoint |
|---|---|---|---|---|
| 106 | | | | 35° C. (95° F.) |
| 108 | | | | 38° C. (100.4° F.) |
| 111 | Y | Y | Y | 49° C. (120.2° F.) |
| 112 | | | | 40° C. (104° F.) |
| 113 | | | | 39° C. (102.2° F.) |
| 114 | Y | Y | Y | 46° C. (114.8° F.) |
| 118 | Y | Y | Y | |
| 120 | Y | Y | Y | |
| 121 | Y | N | N | |
| 122 | Y | Y | Y | |
| 124 | | | Y | |
| 125 | Y | Y | 8 | |
| 126 | Y | Y | 10 | |
| 127 | Y | Y | Y | |
| 128 | Y | Y | N | |
| 129 | Y | Y | Y | |
| 130 | Y | Y | 6 | |
| 131 | Y | Y | 7 | |
| 132 | Y | Y | Y | |
| 133 | Y | Y | 7 | |
| 134 | Y | Y | Y | |
| 135 | Y | N | N | |
| 137 | Y | Y | Y | |
| 138 | Y | Y | Y | |
| 139 | Y | Y | 7 | |
| 140 | Y | N | N | |
| 141 | Y | Y | Y | |
| 143 | Y | Y | 7 | |
| 144 | Y | Y | Y | |
| 145 | Y | Y | Y | |
| 146 | Y | Y | Y | |
| 147 | Y | Y | Y | |
| 148 | Y | Y | N | |
| 149 | Y | Y | Y | |
| 151 | Y | Y | Y | |
| 153 | Y | Y | Y | |
| 155 | Y | Y | 6 | |
| 156 | Y | Y | Y | |
| 157 | Y | Y | Y | |
| 159 | Y | Y | Y | |
| 160 | Y | Y | Y | |
| 163 | Y | Y | N | |
| 164 | Y | Y | 9 | |
| 175 | Y | Y | Y | |
| 176 | Y | Y | N | |
| 179 | Y | N | N | |
| 180 | Y | N | N | |
| 181 | Y | Y | Y | |
| 182 | Y | Y | 7 | |
| 185 | Y | Y | Y | |
| 186 | Y | Y | Y | |
| 187 | Y | Y | Y | |
| 188 | Y | Y | 6 | |
| 191 | Y | Y | Y | |
| 192 | Y | Y | Y | |
| 193 | Y | Y | Y | |
| 194 | Y | N | Y | |
| 196 | Y | N | | |
| 197 | Y | N | Y | |

TABLE 2-continued

| Example Number | Cold Storage Eval. | Cold Storage Stable | Biodiesel Miscible | Flashpoint |
|---|---|---|---|---|
| 199 | Y | N | Y | |
| 203 | Y | N | Y | |
| 204 | Y | Y | Y | |
| 206 | Y | Y | Y | |
| 207 | Y | N | | |
| 208 | Y | N | | |
| 209 | Y | N | | |
| 210 | Y | N | | |
| 211 | Y | N | | |
| 212 | Y | Y | N | |
| 214 | Y | N | | |
| 215 | Y | Y | Y | |
| 216 | Y | Y | | 6 |
| 217 | Y | Y | Y | |
| 218 | Y | Y | Y | |
| 220 | Y | N | Y | |
| 221 | Y | N | Y | |
| 222 | Y | Y | Y | |
| 223 | Y | Y | Y | |
| 224 | Y | Y | Y | |
| 225 | Y | Y | Y | |
| 226 | Y | Y | Y | |
| 227 | Y | N | | |
| 228 | Y | Y | Y | |
| 230 | Y | N | | |
| 233 | Y | N | | 8 |
| 235 | Y | Y | Y | |
| 236 | Y | Y | Y | |
| 238 | Y | Y | Y | |
| 239 | Y | Y | N | |
| 240 | Y | Y | Y | |
| 241 | Y | Y | Y | |
| 242 | Y | Y | N | |
| 244 | Y | N | | |
| 245 | Y | Y | N | |
| 246 | Y | N | | |
| 247 | Y | Y | N | |
| 248 | Y | Y | Y | |
| 249 | Y | Y | Y | |
| 250 | Y | Y | Y | |
| 251 | Y | Y | Y | |
| 253 | Y | Y | Y | |
| 260 | Y | Y | Y | |
| 261 | Y | Y | | 7 |
| 262 | Y | Y | | 6 |
| 263 | Y | Y | Y | |
| 264 | Y | Y | Y | |

Oxidative Stability Testing

The oxidative stability of biodiesel was evaluated using the antioxidant solution of Example 114 above. Biodiesel fuels were prepared using soy oil, tallow (lard), canola oil, cottonseed oil, sunflower oil, and rapeseed oil using methods known to those skilled in the art. Samples of each biodiesel were treated with 0.067% of the antioxidant solution. The treated sample and a control sample containing no antioxidant were placed on the Oxidative Stability Instrument, available from Omnion. The oxidative stability was determined using the procedure from the European EN14112. Results show the effectiveness of the antioxidant solution of Example 114 as compared to the control sample. The results are in Table 6 below. The data show that significant improvement in the induction time, i.e., the amount of time it takes for the mixture to reach the point where the resistance to oxidation is overcome and oxidation of the biodiesel rapidly accelerates.

TABLE 3

| | Oxidative Stability Index (EN14112) Induction Time (hours at 110° C.) | |
|---|---|---|
| Type of Biodiesel | Control (No antioxidant) | 0.067 wt % |
| Soy | 5.95 | 22.7 |
| Tallow (Lard) | 7.05 | 25.18 |
| Canola | 6.95 | 15.58 |
| Cottonseed | 4.9 | 12.43 |
| Sunflower | 0.93 | 8.8 |
| Rapeseed | 5.15 | 13.73 |

Biodiesel prepared from transesterification of soybean oil with methanol, then distilled, was used. The antioxidant/metal chelating compound solution was added at a loading of 0.067 weight percent, based upon the weight of the biodiesel, and mixed on a magnetic stir plate at ambient temperature for 20 minutes. The concentration of the antioxidant in the final test solution was 200 ppm and the metal chelating compound was 10 ppm. The oxidative stability was determined using the procedure from the European EN14112. Results are presented in Table 4.

TABLE 4

| Example Reference Number | OSI (Hrs. at 110° C) |
|---|---|
| Control | 0.35 |
| 24 | 6.25 |
| 35 | 6.7 |
| 22 | 6.9 |
| 27 | 0.4 |
| 23 | 1.35 |
| 26 | 3.9 |
| 36 | 10.0 |
| 31 | 0.4 |
| 32 | 2.85 |
| 33 | 2.35 |
| 25 | 3.05 |

Another batch of biodiesel prepared from transesterification of soybean oil with methanol, then distilled, was used. The antioxidant/metal chelating compound solution was added at a loading of 0.067 weight percent, based upon the weight of the biodiesel, and mixed on a magnetic stir plate at ambient temperature for 20 minutes. The concentration of the antioxidant in the final test solution was 200 ppm and the metal chelating compound was 10 ppm. The oxidative stability was determined using the procedure from the European EN14112. Results are presented in Table 5.

TABLE 5

| Example Reference Number* | OSI (Hrs. at 110° C.) |
|---|---|
| Control | 0.25 |
| 256 | 2.35 |
| 147 | 4.15 |
| 188 | 3.4 |
| 193 | 2.25 |
| 220 | 2.5 |
| 151 | 2.05 |
| 161 | 2.25 |
| 226 | 2.5 |
| 187 | 2.0 |
| 132 | 2.05 |
| 114 | 3.8 |
| 217 | 1.75 |

TABLE 5-continued

| Example Reference Number* | OSI (Hrs. at 110° C.) |
|---|---|
| 181 | 2.35 |
| 184 | 2.0 |
| 153 | 1.10 |
| 157 | 1.4 |
| 223 | 1.05 |
| 196 | 1.10 |
| 199 | 1.05 |
| 259 | 6.5 |
| 175 | 7.15 |
| 247 | 6.75 |
| 241 | 6.65 |

Effect of Order of Addition on Solubility

Example 2 was duplicated except that Prep Mode 8 was used. Visible precipitation of one or more of the components occurred.

Example 114 was duplicated with a different order of combining components. All components were combined in immediate succession (i.e. without allowing time to dissolve one or more components. Visible precipitation of one or more of the components occurred.

Example 114 was again duplicated with yet a different order of combining components. The three solvents were first combined, then the TBHQ was added and completely dissolved therein. Visible precipitation of one or more of the components occurred. These experiments show that order of addition affects solubility in some embodiments (though not all, as the successfully dissolved Prep Mode 8 examples demonstrate).

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents.

What is claimed is:

1. A composition comprising:
   a) between about 25% and about 35% by weight of tert-butyl hydroquinone,
   b) between about 1.0% and about 3.0% by weight of citric acid,
   c) between about 35% and about 45% by weight of diethylene glycol monobutyl ether,
   d) between about 5% and about 10% by weight of propylene glycol, and
   e) between about 20% and about 30% by weight of n-butyl acetate.

2. A composition comprising:
   a) from about 0.001 to about 5 weight % of an antioxidant composition, wherein the antioxidant composition is the composition of claim 1, and
   b) at least one fatty acid or ester of fatty acid.

3. The composition of claim 2, wherein the at least one fatty acid or ester of fatty acids is biodiesel.

4. The composition of claim 2, wherein the composition comprises at least about 90% by weight of the at least one ester of fatty acids.

5. The composition of claim 2, wherein the composition comprises from 0.001 to 0.4 weight % of the antioxidant composition.

6. A composition comprising:
   a) at least one burnable fuel source, and
   b) a biodiesel composition, wherein the biodiesel composition is the composition of claim 3.

7. The composition of claim 6, wherein the at least one burnable fuel source comprises at least one petroleum distillate.

8. The composition of claim 6, wherein the at least one burnable fuel source comprises petroleum diesel.

9. The composition of claim 8, wherein the composition comprises at least about 2% by weight of the biodiesel composition.

10. A method for increasing the oxidative stability of at least one fatty acid or ester of fatty acid, comprising combining the at least one fatty acid or ester of fatty acid with the composition of claim 1.

11. The method of claim 10, wherein at least one fatty acid or ester of fatty acids is biodiesel.

12. A composition comprising:
   a) between about 15% and about 35% by weight of tert-butyl hydroquinone,
   b) between about 1.0% and about 3.0% by weight of citric acid,
   c) between about 35% and about 45% by weight of diethylene glycol monobutyl ether,
   d) between about 5% and about 10% by weight of propylene glycol, and
   e) between about 20% and about 30% by weight of n-butyl acetate,
   wherein the composition comprises 0% to 10% by weight of total surface active agents.

13. A composition comprising:
   a) from about 0.001 to about 5 weight % of an antioxidant composition, wherein the antioxidant composition is the composition of claim 12, and,
   b) at least one fatty acid or ester of fatty acid.

14. The composition of claim 13, wherein the at least one fatty acid or ester of fatty acids is biodiesel.

15. The composition of claim 14, wherein the composition comprises at least about 90% by weight of the at least one esters of fatty acids.

16. The composition of claim 13, wherein the composition comprises from 0.001 to 0.4 weight % of the antioxidant composition.

17. A composition comprising:
   a) at least one burnable fuel source, and
   b) a biodiesel composition, wherein the biodiesel composition is the composition of claim 14.

18. The composition of claim 17, wherein the at least one burnable fuel source comprises at least one petroleum distillate.

19. The composition of claim 17, wherein the at least one burnable fuel source comprises petroleum diesel.

20. The composition of claim 19, wherein the composition comprises at least about 2% by weight of the biodiesel composition.

21. A method for increasing the oxidative stability of at least one fatty acid or ester of fatty acid, comprising combining the at least one fatty acid or ester of fatty acid with the composition of claim 12.

22. The method of claim 21, wherein at least one fatty acid or ester of fatty acids is biodiesel.

* * * * *